United States Patent
Watanabe

(10) Patent No.: US 8,005,051 B2
(45) Date of Patent: Aug. 23, 2011

(54) RE-TRANSMISSION CONTROL METHOD AND RELAY STATION APPARATUS IN A RELAY COMMUNICATION SYSTEM

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1068 days.

(21) Appl. No.: 11/826,886

(22) Filed: Jul. 19, 2007

(65) Prior Publication Data

US 2008/0056173 A1 Mar. 6, 2008

(30) Foreign Application Priority Data

Aug. 31, 2006 (JP) .................................. 2006-235955

(51) Int. Cl.
*H04B 7/216* (2006.01)
(52) U.S. Cl. ........ 370/335; 370/342; 455/33.3; 714/748
(58) Field of Classification Search .................. 370/335, 370/349, 389, 392, 393, 394, 395.1, 395.31, 370/395.4, 401, 428, 342; 455/33.3; 714/748
See application file for complete search history.

(56) References Cited

U.S. PATENT DOCUMENTS

| | | | |
|---|---|---|---|
| 6,539,028 B1 | 3/2003 | Soh et al. | |
| 7,020,218 B2 * | 3/2006 | Arnesen | 375/316 |
| 7,304,980 B2 * | 12/2007 | Amano | 370/349 |
| 7,616,608 B2 * | 11/2009 | Sudo | 370/335 |
| 7,697,484 B2 * | 4/2010 | Kim et al. | 370/334 |
| 7,765,451 B2 * | 7/2010 | Yomo et al. | 714/749 |
| 7,839,858 B2 * | 11/2010 | Wiemann et al. | 370/394 |
| 7,929,988 B2 * | 4/2011 | Horiuchi et al. | 455/550.1 |
| 2002/0093928 A1 | 7/2002 | LoGalbo et al. | |
| 2006/0187874 A1 | 8/2006 | Zaki | |

FOREIGN PATENT DOCUMENTS

| | | |
|---|---|---|
| DE | 202006002933 U1 | 8/2006 |
| EP | 1096719 A2 | 5/2001 |
| JP | 2001-196990 | 7/2001 |

OTHER PUBLICATIONS

Korean Patent Office Action based on Korean Patent Application No. 10-2007-0080575 (dated Dec. 2, 2008).
European Search Report dated Oct. 8, 2010, issued to the corresponding European patent application No. 07112789.8-2412/ 1895701.

* cited by examiner

*Primary Examiner* — Hassan Phillips
*Assistant Examiner* — Mark A Mais
(74) *Attorney, Agent, or Firm* — Murphy & King, P.C.

(57) ABSTRACT

An apparatus for relaying wireless communication between a transmitting station and a receiving station includes, parts for receiving data including control data and plural data blocks from the transmitting station, for detecting whether there is an error in the plural data blocks, part for updating the control data when an error is detected in one of the plural data blocks, for preventing an error-detected data block from being transferred to the receiving station, for transferring the updated control data and remaining data blocks to the receiving station, for generating a first negative response signal corresponding to the error-detected data block, for storing the first negative response signal, for combining the first negative response signal with an affirmative response signal or a second negative response signal received from the receiving station according to error detection results by the receiving station, and for transmitting the combined response signal to the transmitting station.

12 Claims, 20 Drawing Sheets

RE-TRANSMISSION CONTROL METHOD AND RELAY STATION APPARATUS IN A RELAY COMMUNICATION SYSTEM

BACKGROUND OF THE INVENTION

1. Field of the Invention

The present invention generally relates to a re-transmission control method and a relay station apparatus in a relay communication system, and more particularly to a re-transmission control method and a relay station apparatus in a relay communication system used for mobile communications.

2. Description of the Related Art

In recent years and continuing, there is an increasing use of mobile communications for the purpose of data communications with, for example, portable telephones and wireless LAN. Thus, wireless broadband access systems for achieving faster data communications are being studied.

Compared to conventional communication systems used for purposes such as telephone communications, wireless broadband access systems are expected to provide higher wireless quality. Furthermore, since transmission power of mobile stations is limited due to constraints such as their limited power capacity, it is difficult to expand the wireless area that can be covered by a single wireless base station. Under these circumstances, in order to expand communication service areas and increase communication quality, studies are being made for relay communication systems performing relay communications by positioning relay stations at outer end parts of communication service areas or dead areas where radiowaves cannot reach and performing communications between wireless base stations and mobile stations via the relay stations.

In mobile communications, transmission paths change along with the passage of time due to, for example, movement of the mobile station or changes in the radio-wave environment (surrounding mobile objects, weather, etc.). Therefore, each data block (packet) of communication data has added error correction/detection symbols for allowing a receiver station to determine whether there are any errors in the decoded or reproduced data. In a case where an error is detected, the receiver station requests for the communication data to be re-transmitted. One commonly known method for automatically performing a re-transmission process is an ARQ (Automatic Repeat Request).

Furthermore, another well known method for automatically performing a re-transmission process is a HARQ (Hybrid Automatic Repeat Request) method which effectively uses received data that have not been successfully received (error-detected data). With the HARQ method, a receiver station buffers error detected data and subsequently combines the buffered data with re-transmitted data, to thereby perform a decoding process on the combined data.

In a case where such re-transmission methods are used in the above-described relay communication system, it is necessary to optimize re-transmission control by considering, for example, transmission quality of plural transmission paths between a transmitting station and a receiving station via one or more relay stations and process delay of each relay station and receiving station.

Japanese Laid-Open Patent Application No. 2001-196990 (hereinafter referred to as "Patent Document 1") discloses a methodology of performing re-transmission control in a relay transmission system by positioning a relay transmission apparatus between a data transmitting apparatus and a data receiving apparatus and relaying data without simultaneously performing data transmission and data reception.

FIG. 14 shows an example of a communication system (to which the present invention may be applied). As shown in FIG. 14, communications are performed between a wireless base station (BS) and mobile stations (MS) #0-#2 via a relay station (RS). It is to be noted that communications may also be performed directly between the wireless base station (BS) and a mobile station (MS) #3 without the intervention of the relay station (RS).

The transmission path between the wireless base station (BS) and the relay station (RS) is hereinafter also referred to as a "relay link" and the transmission path between the relay station (RS) and the mobile station (MS) is hereinafter also referred to as an "access link". In a case of performing communications between the wireless base station (BS) and the mobile station (MS) where there are two types of wireless link paths (relay link and access link), communication data error may occur in either one of the links according to, for example, the statuses of the transmission paths.

FIG. 15 is a schematic diagram showing an exemplary configuration of a wireless frame for relay communications. In the example shown in FIG. 15, one frame period is divided into four time phases. The relay link is assigned to a communication period between the wireless base station (BS) and the relay station (RS). The access link is assigned to a communication period between the relay station (RS) and the mobile station (MS).

Access timings for both communication directions are assigned to the relay link and the access link, respectively. The communication paths assigned to the access timing for communication from the wireless base station (BS) and the relay station (RS) and communication from the relay station (RS) and the mobile station (MS) are hereinafter also referred to as "downstream link". The communication path assigned to the access timing for communication from the relay station (RS) to the wireless base station (BS) and communication from the mobile station (MS) to the relay station (RS) are hereinafter also referred to as "upstream link".

More specifically, the communication path from the wireless base station (BS) to the relay station (RS) is referred to as "downstream relay link", the communication path from the relay station (RS) to the mobile station (MS) is referred to as "downstream access link", the communication path from the mobile station (MS) to the relay station (RS) is referred to as "upstream access link", and the communication path from the relay station (RS) to the wireless base station (BS) is referred to as "upstream relay link".

Plural data blocks of communication data or plural response signals can be transmitted within the communication periods of each link by using, for example, time division multiplexing, frequency division multiplexing, or code division multiplexing. Furthermore, data regarding the number of transmission data blocks (transmission data number) or frame format are transmitted as control data from the wireless base station (BS) in the downstream link.

The example shown in FIG. 15 is a frame in a case where the wireless base station (BS) transmits plural data blocks (DATA #1-#4) bound for the mobile station (MS) in the downstream link and the mobile station (MS) transmits response signals corresponding to the received data blocks to the wireless base station (BS) in the upstream link. In this case, the mobile station (MS) detects errors in data blocks DATA#2 and DATA#4 and transmits negative response signals (NACK) #2 and #4 requesting re-transmission with respect to DATA#2 and DATA#4 in the upstream link. In addition, the mobile station (MS) transmits affirmative response signals (ACK) #1 and #3 indicating successful receipt of data with respect to DATA #1 and #3.

It is to be noted that the exemplary frame configuration of FIG. 15 is illustrated without considering delay of data blocks or response signals (e.g., a case where delay of a data symbol decoding process or an error detection process by the mobile station (MS) causes response signals to reach the wireless base station a few frames after and prevents the reception signals from reaching the wireless base station (BS) within the same frame as the transmission of its corresponding data blocks, and a case where delay of a relay process by the relay station (RS) causes data blocks or response signals to be relayed one or more frames after the frame of receiving the data blocks or the response signals).

FIG. 16 is a sequence diagram showing data communication according to the frame shown in FIG. 15. As shown in FIG. 16, the wireless base station (BS), after receiving a data transmission request (16-1), generates control data including transmission data number or frame format (16-2) and transmission data blocks (16-3). Then, the wireless base station (BS) transmits the generated control data (in this example, control data #1) and data blocks (in this example, DATA #1, #2, #3, and #4) to the mobile station (MS) via the relay station (RS).

The mobile station (MS) receiving the control data #1 extracts a control data item(s) included in the control data #1 (16-4). Furthermore, the mobile station (MS) receiving the DATA #1, #2, #3, and #4 performs error detection on the DATA #1, #2, #3, and #4 (16-5). Then, the mobile station (MS) generates response signals indicating the results of the error detection (16-6). Then, the mobile station (MS) transmits response signals ACK #1, ACK #3, NACK #2 and NACK #4 to the wireless base station (BS) via the relay station (RS).

Then, the wireless base station (BS) receiving the response signals ACK #1, ACK #3, NACK #2 and NACK #4 from the mobile station (MS) detects a re-transmission request (16-7) and generates re-transmission control data (16-8). Then, the wireless base station (BS) transmits the generated re-transmission control data as control data #2 to the mobile station (MS) via the relay station (RS). Furthermore, the wireless base station (BS) generates re-transmission data blocks (16-9) and transmits the generated re-transmission data blocks as re-transmission data blocks DATA #2 and DATA #4 to the mobile station (MS) via the relay station (RS).

The mobile station (MS) receiving the re-transmission control data #2 extracts a control data item(s) included in the control data #2 (16-10). Furthermore, the mobile station (MS) receiving the re-transmission data blocks DATA #2 and DATA #4 performs error detection on the re-transmission data blocks DATA #2 and DATA #4 (16-11). Then, the mobile station (MS) generates response signals indicating the results of the error detection (16-12) and transmits the generated response signals ACK #2 and ACK #4 to the wireless base station (BS) via the relay station (RS).

In the relay station (RS) according to the above-described sequence diagram, control data and data blocks received through the relay link from the wireless base station (BS) are directly transmitted as they are to the access link. Furthermore, response signals received through the access link from the mobile station (MS) are directly transmitted as they are to the relay link.

Accordingly, since the relay station (RS), receiving data blocks through the downstream relay link from the wireless base station (BS), transfers all the received data blocks to the mobile station (MS) through the downstream access link without performing error detection on the received data blocks, invalid data cannot be prevented from being transmitted from the relay station (RS) in a case where there is an error in the data blocks received from the wireless base station (BS) since the data blocks are transmitted as they are to the downstream access link.

Accordingly, such transmission by the relay station (RS) is a waste of transmission power and is an ineffective use of wireless transmission resources (Problem 1). Furthermore, in such a case, processes of the mobile station (MS) become delayed since the decoding process and the error detection process are performed based on the invalid data. Using power for performing such processes is also a waste of power (Problem 2).

FIG. 17 is a schematic diagram showing an exemplary frame configuration in a case where error data are not transmitted to a downstream access link when a relay station (RS) detects an error in the data in a downstream relay link. Furthermore, FIG. 18 is a sequence diagram showing data communication according to the frame shown in FIG. 17. In the sequence diagram shown in FIG. 18, the relay station (RS) performs error detection on data blocks DATA #1, #2, #3, and #4 received through the downstream relay link (18-1), deletes DATA #4 from which an error is detected (18-2), and transfers errorless data blocks DATA #1, #2, and #3 to the downstream access link. Thereby, an empty space is created in the downstream access link since the data block #4 is not transferred to the downstream access link.

Then, in the same manner as FIG. 16, the mobile station (MS), receiving control data #1 from the base station (BS) via the relay station (RS), extracts a control data item(s) from the control data #1 (16-4). Then, the mobile station (MS), receiving the data blocks Data #1, #2, and #3 from the base station (BS) via the relay station (RS), performs error detection (including detection of unreceived data) on the data blocks DATA #1, #2, and #3 (16-5) and generates a response signal (16-6). In a case where the mobile station (MS) detects that an error in data block Data #2 and no reception of data block DATA #4, the mobile station (MS) returns (transmits) negative response signals NACK #2 and #4 to the wireless base station (BS) via an upstream access link and an upstream relay link.

Then, the relay station (RS) also performs error detection on the re-transmission data blocks DATA #2 and #4 (18-3), deletes an error-detected re-transmission data block(s) if any errors are detected in the re-transmission block (18-4), and transmits an errorless data block DATA #2 and #4 to the mobile station (MS).

As shown in FIGS. 17 and 18, although the above-described Problem 1 may be overcome by deleting error-detected data blocks and preventing the error-detected data blocks from being transferred to the mobile station (MS) at the relay station (RS), the above-described Problem 2 cannot be resolved. Furthermore, available (empty) wireless transmission resources, which are created by preventing the error-detected data blocks from being transferred to the mobile station (MS), cannot be effectively utilized (unless some modifications are made) (Problem 3).

That is, in general, the mobile station (MS) transmits and receives data blocks based on control data (designating, for example, transmission timing, modulation method, and error correction coding method) from the wireless base station (BS). Therefore, even where the relay station (RS) deletes error data blocks and creates an empty (available) space in the downstream access link, the available wireless transmission resource cannot be utilized unless changes are made in the designation content of the control data.

Although the relay transmission system disclosed in Patent Document 1 performs an operation similar to that described with FIGS. 17 and 18, the relay station in the relay transmission system is provided with a re-transmission buffer for storing data transmitted from a transmitting station therein. Accordingly, in a case where the relay station receives a re-transmission request from a receiving station, the relay station, without transferring the re-transmission request to the transmitting station, transmits the data stored in the re-transmission buffer as re-transmission data to the receiving station.

Although the relay transmission system disclosed in Patent Document 1 can omit the process of transmitting a re-transmission request to an upstream relay link, the relay transmission system requires a re-transmission buffer to be provided in the relay station. This complicates the storing of data in the re-transmission buffer and managing the disposal of the data stored in the re-transmission buffer (Problem 4). Furthermore, this relay transmission system has the same problem as Problem 3 in which there is no method of effectively utilizing wireless transmission resources of the downstream access link that are created when error-detected data blocks are prevented from being transferred.

FIG. 19 is a schematic diagram showing an exemplary frame configuration in a case where a relay station buffers signals received from the downstream relay link and the upstream access link and separately operates the relay link and the access link asynchronously. FIG. 20 is a sequence diagram showing data communication according to the frame shown in FIG. 19. With the configuration shown in FIGS. 19 and 20, the relay link and the access link can effectively use the available wireless transmission resources separately. However, this configuration requires a re-transmission buffer to be provided in the relay station (RS) in correspondence with the downstream link and the upstream link, respectively. This increases the size of the relay station (RS) and causes difficulty in mounting the relay station (RS).

Furthermore, since the access link is operated asynchronously with the relay link, the wireless base station (BS) is unable to have a direct grasp (comprehension) of the status of communication quality of the mobile station (MS). Therefore, in a case where, for example, the wireless base station (BS) provides a priority class (QoS) with respect to each mobile station in the entire service area, the wireless base station (BS) does not have uniform control over its wireless resources during scheduling and assigning the wireless resources according to priority class (QoS) This makes it difficult for the wireless base station (BS) to assign wireless resources in correspondence with communication quality of the mobile station (MS) (Problem 5).

SUMMARY OF THE INVENTION

The present invention may provide a re-transmission control method and a relay station apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a re-transmission control method and a relay station apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a re-transmission control method for conducting wireless communication between a transmitting station and a receiving station via a relay station, the method including the steps of: a) transmitting data including control data and a plurality of data blocks from the transmitting station to the relay station; b) detecting whether there is an error in the plural data blocks at the relay station; c) updating the control data when an error is detected in at least one of the plural data blocks at the relay station; d) preventing an error-detected data block at the relay station from being transferred to the receiving station; e) transferring the updated control data and remaining data blocks from the relay station to the receiving station; f) generating a first negative response signal corresponding to the error-detected data block at the relay station; g) storing the first negative response signal at the relay station; h) detecting whether there is an error in the remaining data blocks transferred from the relay station at the receiving station; i) returning an affirmative response signal or a second negative response signal according to the detection results of step h) from the receiving station to the transmitting station; j) combining the first negative response signal with the affirmative response signal or the second negative response signal at the relay station; k) transmitting the combined response signal from the relay station to the transmitting station; and l) re-transmitting the error-detected data blocks corresponding to the first and second negative response signals from the transmitting station.

Furthermore, another embodiment of the present invention provides a relay station apparatus for relaying wireless communication between a transmitting station and a receiving station, the relay station apparatus including: a receiving part for receiving data including control data and a plurality of data blocks from the transmitting station; a detecting part for detecting whether there is an error in the plural data blocks; an updating part for updating the control data when an error is detected in at least one of the plural data blocks; a preventing part for preventing an error-detected data block from being transferred to the receiving station; a transferring part for transferring the updated control data and remaining data blocks to the receiving station; a generating part for generating a first negative response signal corresponding to the error-detected data block; a storing part for storing the first negative response signal; a combining part for combining the first negative response signal with an affirmative response signal or a second negative response signal received from the receiving station according to error detection results by the receiving station; and a transmitting part for transmitting the combined response signal to the transmitting station.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1:
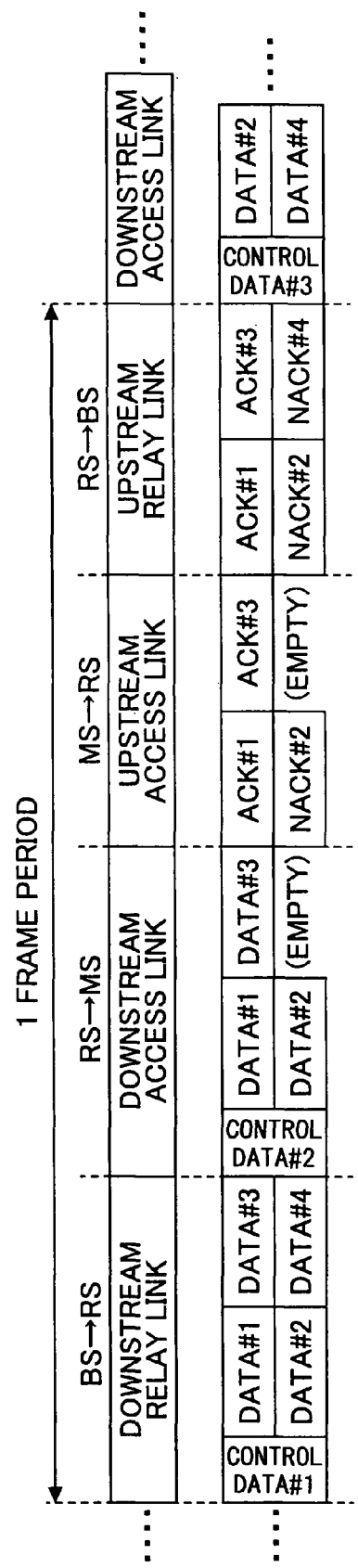
FIG. 1 is a schematic diagram showing an exemplary configuration of a frame for relay communications according to an embodiment of the present invention.
Figure 2:
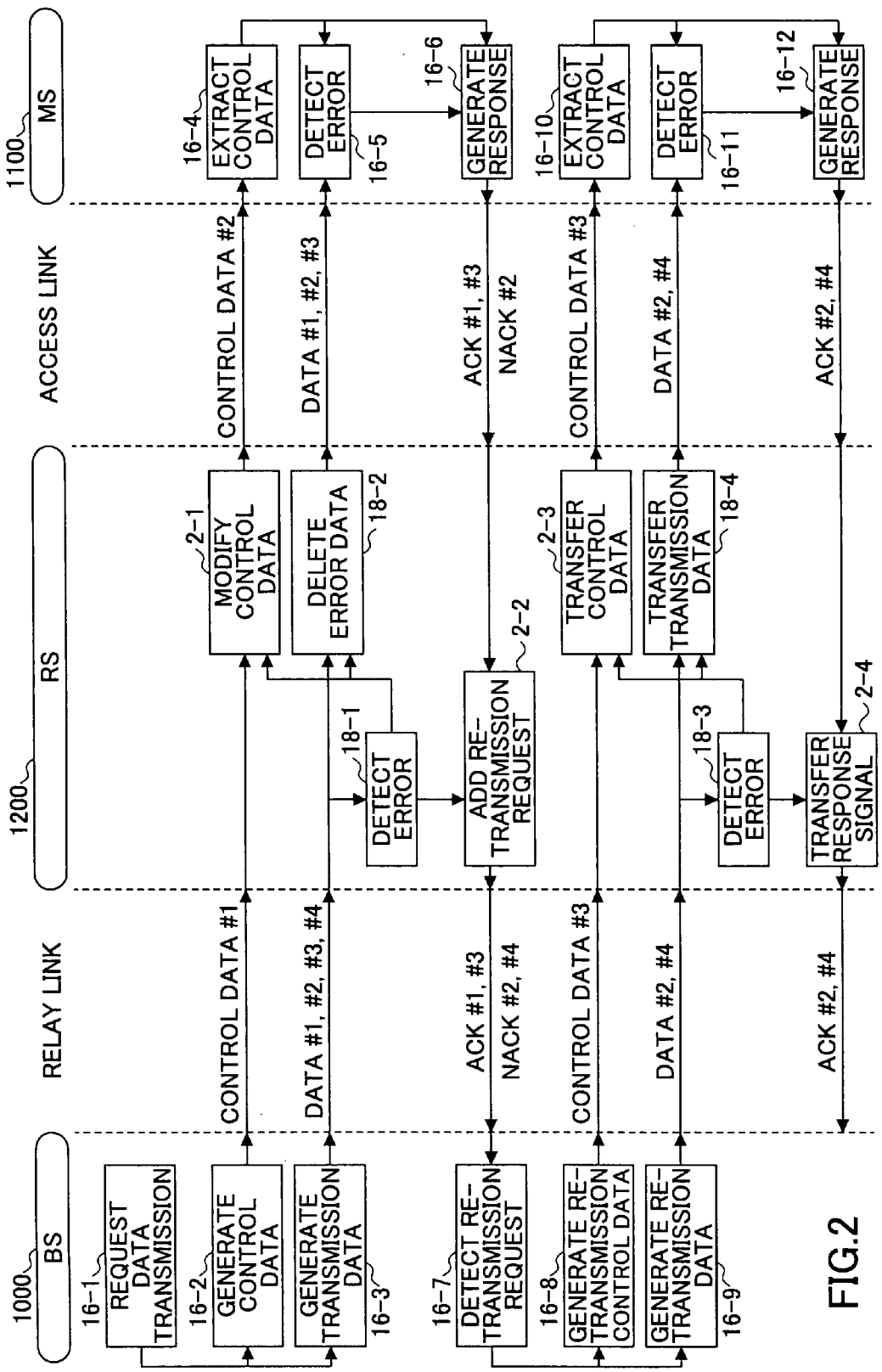
FIG. 2 is a sequence diagram showing data communication according to the frame shown in FIG. 1.

FIG. 1 is a schematic diagram showing an exemplary frame configuration in a case of performing relay communications according to an embodiment of the present invention. FIG. 2 is a sequence diagram showing data communication according to the frame shown in FIG. 1. In FIG. 2, a relay station (RS) performs error detection on data blocks received through a downstream relay link (18-1). Then, the relay station (RS) transfers errorless data blocks to a mobile station (MS) (receiving station) and prevents error-detected data blocks from being transferred to a downstream access link by deleting the error-detected data blocks (18-2). Along with preventing error-detected data blocks from being transferred, the relay station (RS) generates new control data #2 based on control data #1 received through the downstream relay link (2-1). The relay station (RS) generates (updates) the control data #2 by modifying a part of the control data #1 indicating the amount of transmission data changed according to the deletion of the error-detected data blocks. Then, the relay station (RS) transmits the generated control data #2 to the downstream access link. Furthermore, the relay station (RS) generates a negative response signal (NACK) of a re-transmission request indicating the error-detected data block and stores the negative response signal therein.

The mobile station (MS) receiving transferred data blocks from the relay station (in this example, data blocks Data #1, #2, and #3) performs error detection on the received data blocks (16-5). The mobile station (MS) generates a response signal according to the detection results and transmits the generated response signal to an upstream access link (16-6). The relay station (RS) adds (combines) its stored negative response signal (NACK) of the re-transmission request (i.e. re-transmission request for the error-detected data block received from the downstream relay link) to the response signal received from the upstream access link (2-2) and transmits the response signal to a wireless base station (BS) (transmitting station) through an upstream relay link.

The wireless base station (BS) receiving the response signal through the upstream relay link from the relay station (RS) detects the re-transmission request in the received response signal (16-7), to thereby perform a re-transmission process for the error-detected data blocks corresponding to the downstream relay link (in this example, data block DATA #4) and the error-detected data blocks corresponding to the downstream access link (in this example, data block DATA #2). The re-transmission process includes the processes of generating re-transmission control data and generating re-transmission data (16-8, 16-9).

FIG. 2 shows a case where no error occurs in the re-transmission of data. When the relay station (RS) detects no error in the data received through the downstream relay link (including control data #3 and affirmative response signals ACK #2, #4), the relay station (RS) transfers the control data #3 and the affirmative response signals ACK #2, #4 received from the wireless base station (BS) to the mobile station (MS) ((2-3) and (2-4)).

According to the above-described processes in the sequence diagram of FIG. 2, the mobile station (MS) does not need to perform a decoding process, an error detection process or a response signal generation process with respect to error-detected data blocks corresponding to the downstream relay link. Furthermore, the mobile station (MS) does not need to prepare wireless resources for a corresponding response signal of a re-transmission request in the upstream access link. Thereby, wireless resources can be used for other communications in the upstream access link.

Conventionally, there may be a case where delays in the relay process of the relay station (RS) or delays in the response process of the mobile station (MS) cause the relay process or the response process to be performed in a subsequent frame rather than a frame corresponding to target received data. However, in a case where an error is detected in the data received from the downstream relay link, the relay station (RS) according to an embodiment of the present invention transmits a re-transmission response to the wireless base station (BS) in a form that identifies the error-detected data block.

Compared to a conventional case, the above-described embodiment of the present invention enables a re-transmission response from the mobile station (MS) to be transmitted in an upstream relay link in an earlier frame. Thereby, the time for the re-transmission response to reach the wireless base station (BS) can be shortened. Thus, the mobile station (MS) can receive the re-transmitted data in an earlier frame.

In the above-described embodiment of the present invention, since the relay station (RS) can detect an error in the data block(s) transmitted through the downstream relay link and identify the error-detected data block, a re-transmission request from the relay station (RS) can be realized, for example, by (1) assigning resources in the upstream relay link dedicated for transmitting response signals,
(2) converting a response signal (to be transferred to the upstream relay link) received from the mobile station (MS) to a response signal that enables the error detected in the relay station (RS) to be identifiable and transmitting the converted response signal,
(3) transmitting a re-transmission request(s) through commonly sharable contention-based resources of the upstream relay link, and
(4) adding a re-transmission request(s) to other data blocks transmitted to the upstream relay link and transmitting the data blocks having added the re-transmission request(s). Furthermore, in a case where a suitable resource(s) cannot be obtained for transmitting a re-transmission request to the upstream relay link, the transmission of the re-transmission request may be made to wait (standby) for a predetermined period.

Since the above-described processes described in FIG. 2 can be performed in synchronization with the schedule set in the control data by the wireless base station (BS) without having to change assignment of resources in the relay link and access link for each phase in a single frame, the processes can be achieved without having to report changes in the data to the wireless base station (BS). Thus, the wireless base station (BS) need not change its method of controlling the entire wireless frame.

By performing the processes shown in the sequence diagram of FIG. 2, the process of preventing data block DATA #4 from being transferred to the downstream access link serves to create an empty space (vacancy) in a wireless transmission resource of the downstream access link (See FIG. 1). Furthermore, since no response signal corresponding to data block DATA #4 is transmitted in the upstream access link, an empty space (vacancy) can be created in a wireless transmission source of the upstream access link (See FIG. 1).

Figure 3:
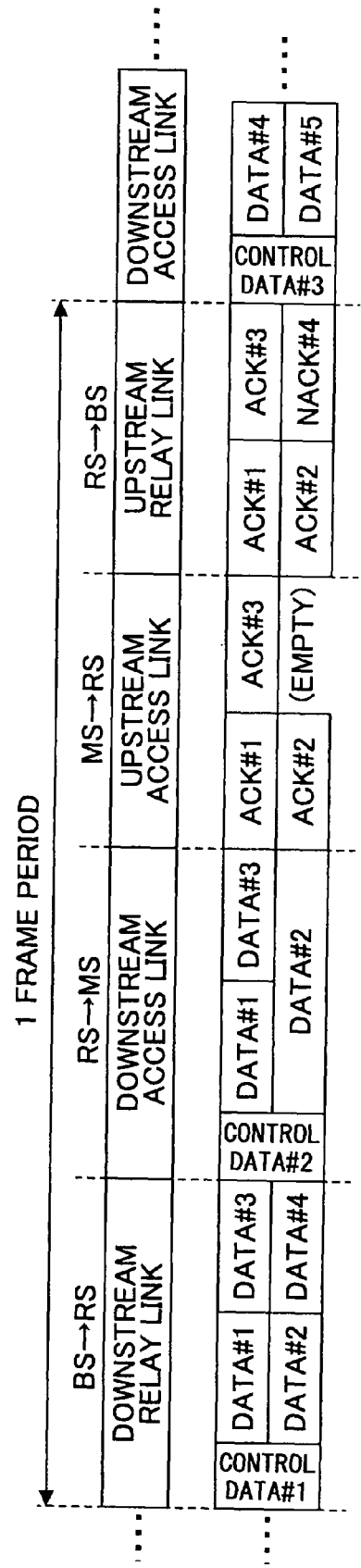
FIG. 3 is a schematic diagram showing an exemplary frame configuration in a case of making effective use of wireless transmission resources according to an embodiment of the present invention.
Figure 4:
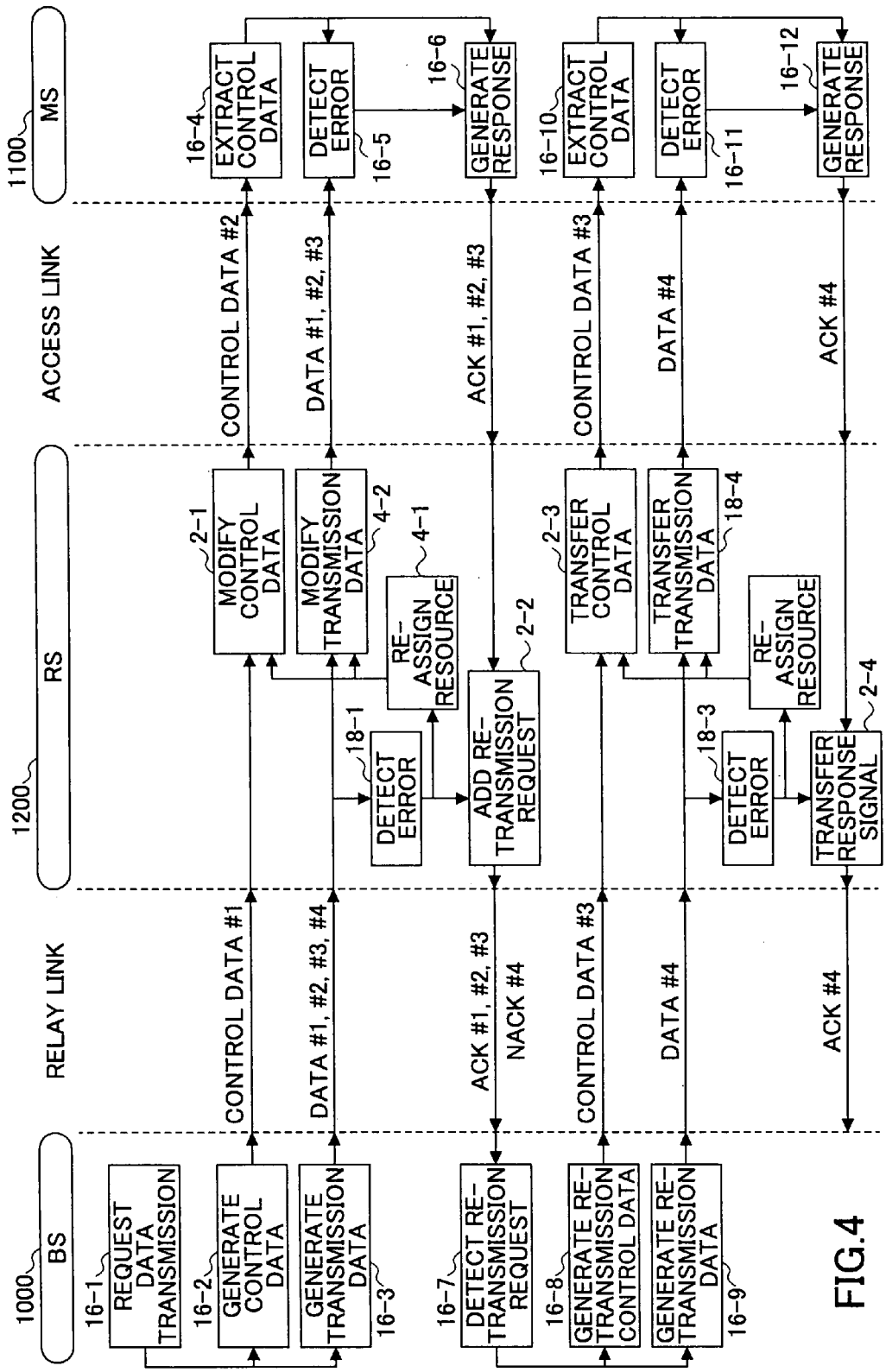
FIG. 4 is a sequence diagram showing data communication according to the frame shown in FIG. 3.

FIG. 3 is a schematic diagram showing an exemplary frame configuration in a case of making effective use of the above-described available wireless transmission resources according to an embodiment of the present invention. FIG. 4 is a sequence diagram showing data communication according to the frame shown in FIG. 3. In a case where the relay station (RS) detects an error in a data block received through the downstream relay link, the error-detected data block is deleted from the other remaining data to be transferred to the mobile station (MS). Accordingly, a wireless transmission resource originally prepared for the deleted data block is combined (added) to other wireless transmission resources prepared to be assigned to the other remaining data (errorless data blocks). Thus, the wireless transmission resources including the combined (added) wireless transmission resource are assigned to the errorless data blocks (4-1).

In this example shown in FIG. 4, the data (transmission data) to be transmitted to the mobile station (MS) are modified by adding and assigning a wireless transmission resource (transmission time) of the downstream access link corresponding to an error-detected data block DATA #4 to an errorless data block DATA #2 (4-2). Thereby, transfer quality of the downstream access link corresponding to the data block DATA #2 can be increased and the reception quality of the mobile station (MS) with respect to data block DATA #2 can be improved. It is to be noted that the control data to be transmitted to the mobile station (MS) are also modified (updated) together with the modification of the transmission data (2-1).

In a system where plural mobile stations (MS) communicate with the relay station during an access link period of a single frame by using, for example, TDMA, FDMA, CDMA, or OFDMA, the data block(s) to which a resource(s) is assigned (re-assigned) may be a data block having the same destination (mobile station) as the error-detected data block or a data block to be transmitted to another mobile station.

Figure 5:
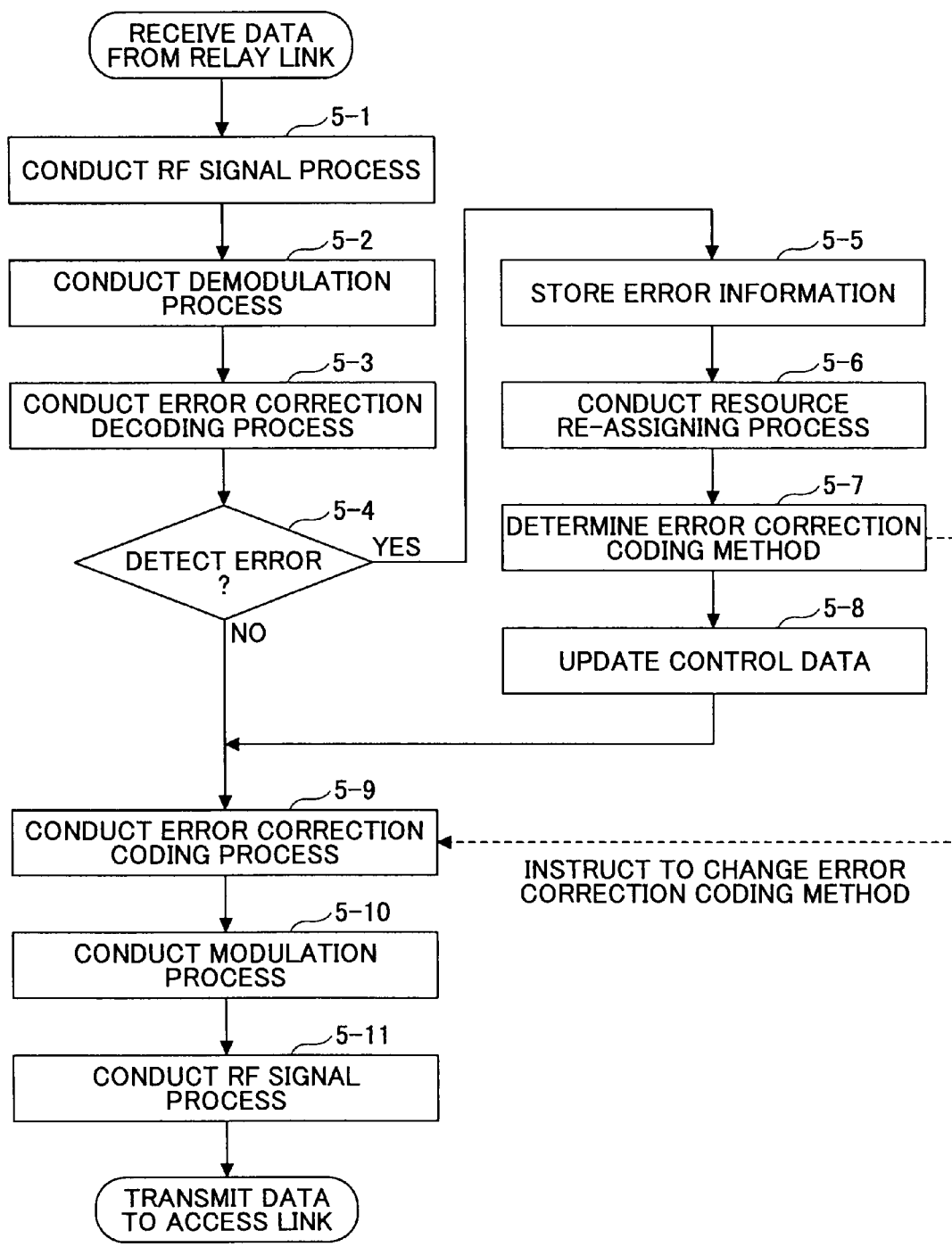
FIG. 5 is a flowchart showing an example of effectively making use of a wireless transmission resource (in this example, changing an error correction coding method) according to an embodiment of the present invention.

FIG. 5 is a flowchart showing an example of effectively making use of a wireless transmission resource (in this example, changing an error correction coding method) according to an embodiment of the present invention.

In FIG. 5, when the relay station (RS) receives data from the downstream relay link, the relay station (RS) performs an RF signal process (5-1), a demodulation process (5-2), and an error correction decoding process (5-3) on the received data for detecting errors in the received data. The relay station (RS) performs error detection based on predetermined data (e.g. data regarding error correction/detection codes) in the data blocks (5-4). In a case where an error is detected, the relay station (RS) stores information regarding the error (error information) (5-5) and performs a re-assigning process in which a wireless transmission resource of a downstream access link originally assigned to the error-detected data block is re-assigned to an errorless data block (5-6).

Then, the errorless data block, having its wireless transmission resources (e.g. communication time, frequency bandwidth) increased by the re-assigning process, is subject to a process of determining an error correction coding method using correction codes having a greater number of redundant bits. That is, the relay station (RS) determines the error correction coding method to be applied to the errorless data block (5-7) in which the code rate of the determined error correction coding method is changed to a code rate lower than the error correction coding method used in the relay link. The data indicating such changes (e.g. change of coding method, data length) are reported (transmitted) to the mobile station (MS) by updating the control data to be transmitted to the downstream access link (5-8). The processes following this step are basically the same as those of a typical operation of transmitting data to the access link, that is, performing an error correction coding process according to the updated coding method (5-9), a modulation process (5-10), and a RF signal process (5-11).

Figure 6:
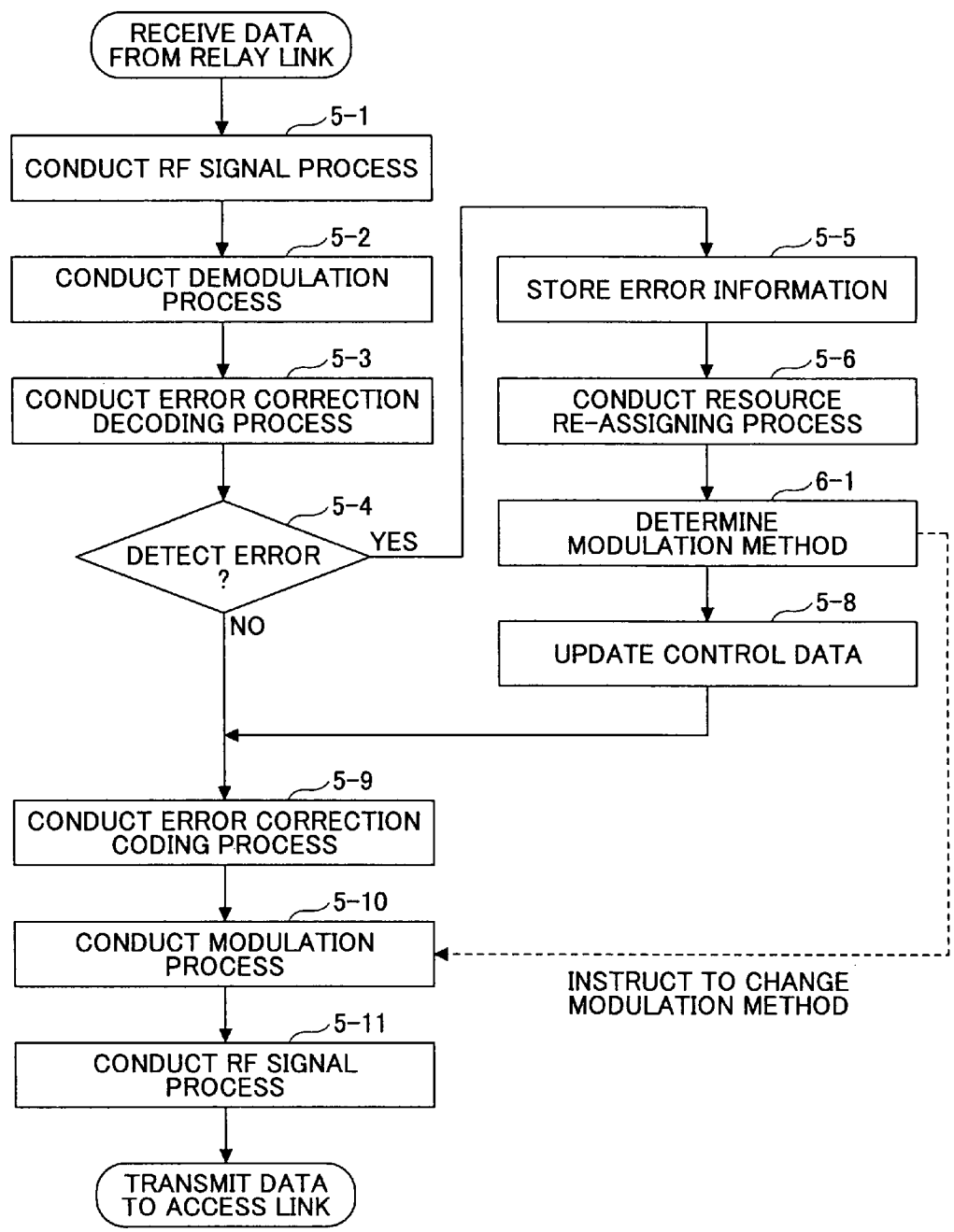
FIG. 6 is a flowchart showing an example of effectively making use of a wireless transmission resource (in this example, changing a modulation method) according to an embodiment of the present invention.

FIG. 6 is a flowchart showing an example of effectively making use of a wireless transmission resource (in this example, changing a modulation method) according to an embodiment of the present invention. In a case where an error is detected, the relay station (RS) stores information regarding the error (error information) (5-5) and performs a re-assigning process in which a wireless transmission resource (e.g. communication time, frequency bandwidth) of a downstream access link originally assigned to the error-detected data block is re-assigned to an errorless data block (5-6). Then, the errorless data block, having its wireless transmission resources increased by the re-assigning process, is subject to a process of determining a modulation method having longer inter-symbol distance (i.e. modulation method having less multivalue) (6-1). The data indicating such changes (e.g. change of modulation method) are reported (transmitted) to the mobile station (MS) by updating the control data to be transmitted to the downstream access link (5-8).

Figure 7:
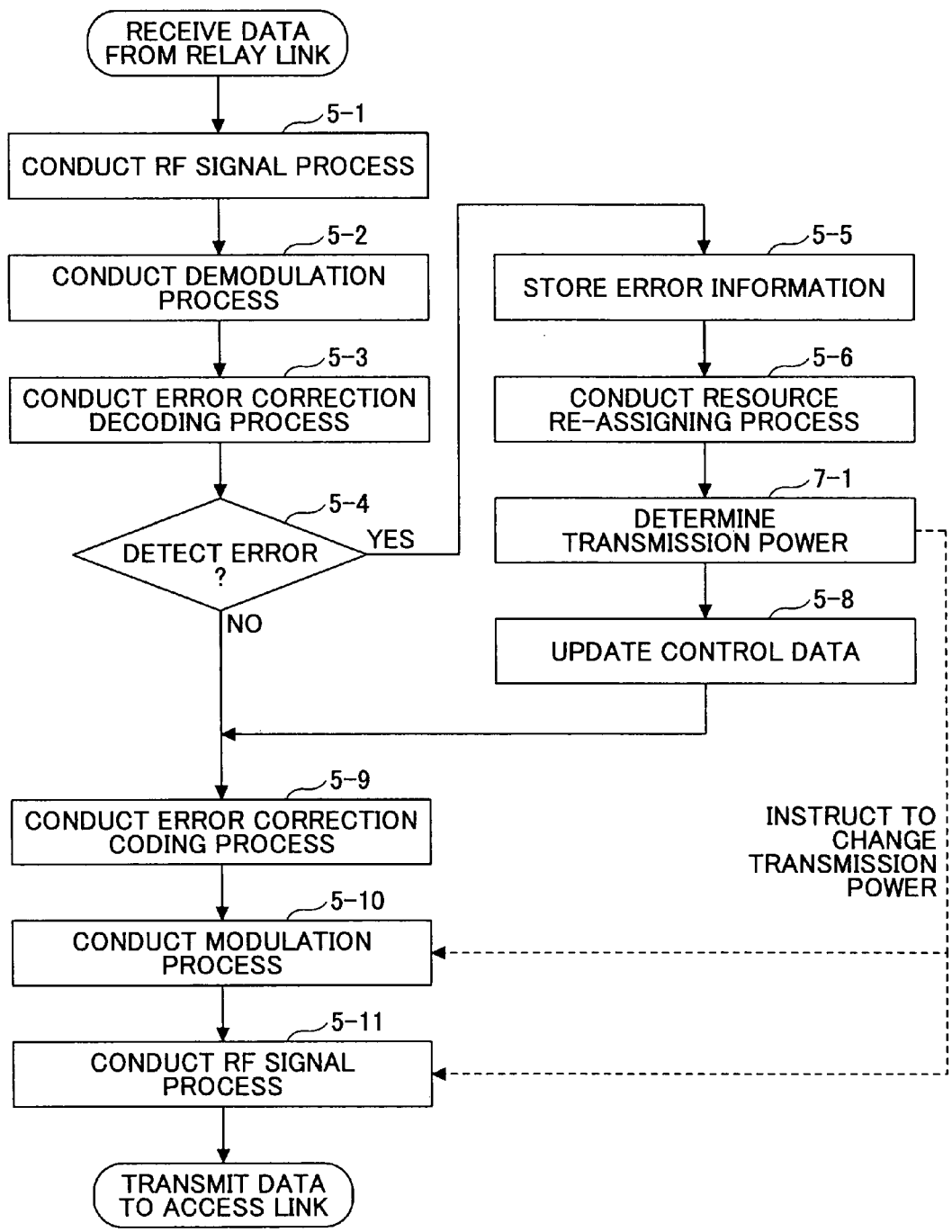
FIG. 7 is a flowchart showing an example of effectively making use of a wireless transmission resource (in this example, changing transmission power) according to an embodiment of the present invention.

FIG. 7 is a flowchart showing an example of effectively making use of a wireless transmission resource (in this example, changing transmission power) according to an embodiment of the present invention. In a case where an error is detected, the relay station (RS) stores information regarding the error (error information) (5-5) and performs a re-assigning process in which a wireless transmission resource (e.g. transmission power) of a downstream access link originally assigned to the error-detected data block is re-assigned to an errorless data block (5-6). Then, the errorless data block, having its wireless transmission resources increased by the re-assigning process, is subject to a process of determining the transmission power (7-1). As for the method of changing transmission power, there is, for example, a method of increasing the symbol level of a base band in the modulation process (5-10) or a method of increasing the output level of an amplifier of wireless signals in the RF signal process (5-11).

Figure 8:
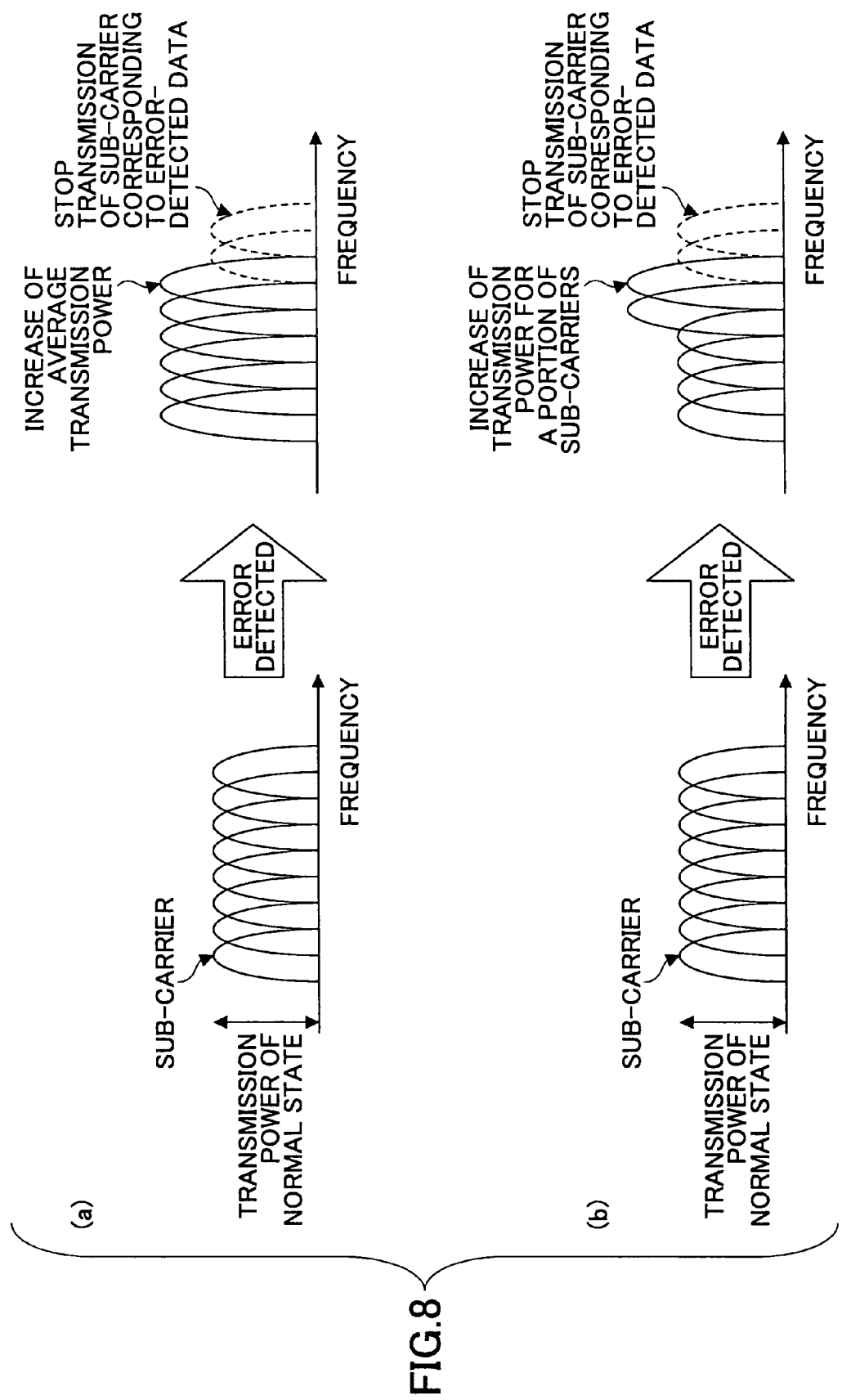
FIG. 8 is a schematic diagram showing an example of assigning transmission power to sub-carriers in a case where an OFDM communication method is used according to an embodiment of the present invention.

Furthermore, as for the method of assigning transmission power, there is, for example, a method of increasing transmission power for each data block or a method of evenly increasing transmission power for all data blocks. FIG. 8 is a schematic diagram showing an example of assigning transmission power to sub-carriers in a case where an OFDM communication method is used according to an embodiment of the present invention. More specifically, FIG. 8(*a*) shows a case where the transmission power of a sub-carrier corresponding to an error-detected data block prevented from being transmitted (illustrated with broken lines) is assigned to all the sub-carriers corresponding to the other remaining data blocks so that the transmission power for all of the sub-carriers can be evenly increased. FIG. 8(*b*) shows a case where the transmission power of a sub-carrier corresponding to an error-detected data block prevented from being transmitted (illustrated with broken lines) is assigned to a part of the sub-carriers corresponding to the other remaining data blocks so that the transmission power for the part of the sub-carriers can be increased. In accordance with the different types of assigning transmission power, an instruction indicating change of transmission power is reported to a digital modulation process part or an RF signal process part. The above-described method of controlling the assignment of transmission power may also be used for other communication methods such as FDM (Frequency Division Multiplex) and CDM (Code Division Multiplex).

Figure 9:
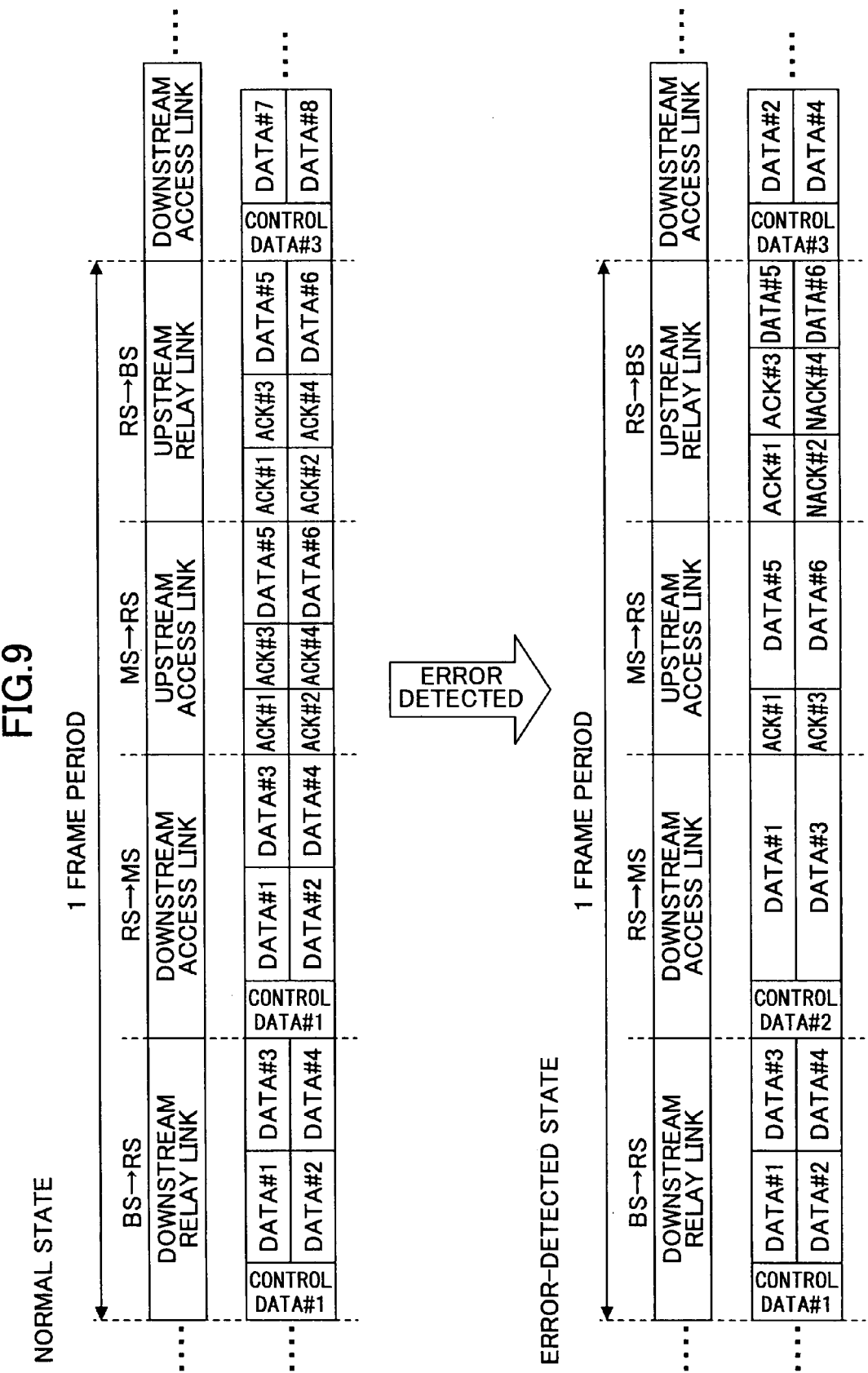
FIG. 9 is a schematic diagram showing an exemplary frame configuration in a case of effectively making use of a wireless transmission resource (in this example, changing the upstream access link) according to an embodiment of the present invention.

FIG. 9 is a schematic diagram showing an exemplary frame configuration in a case of effectively making use of a wireless transmission resource (in this example, changing the upstream access link) according to an embodiment of the present invention. In a case where a relay station (RS) detects an error in the data transmitted through the downstream relay link, the relay station (RS) does not transfer the error-detected data block to the mobile station (MS). In this case, a wireless transmission resource of the upstream access link that has been originally assigned for allowing the mobile station (MS) to transmit a negative response signal of a re-transmission request can be re-assigned for other communications in the upstream access link. In the example shown in FIG. 9, such available wireless transmission resources are re-assigned to transmitting data blocks DATA #5 and #6 in the upstream link.

Figure 10:
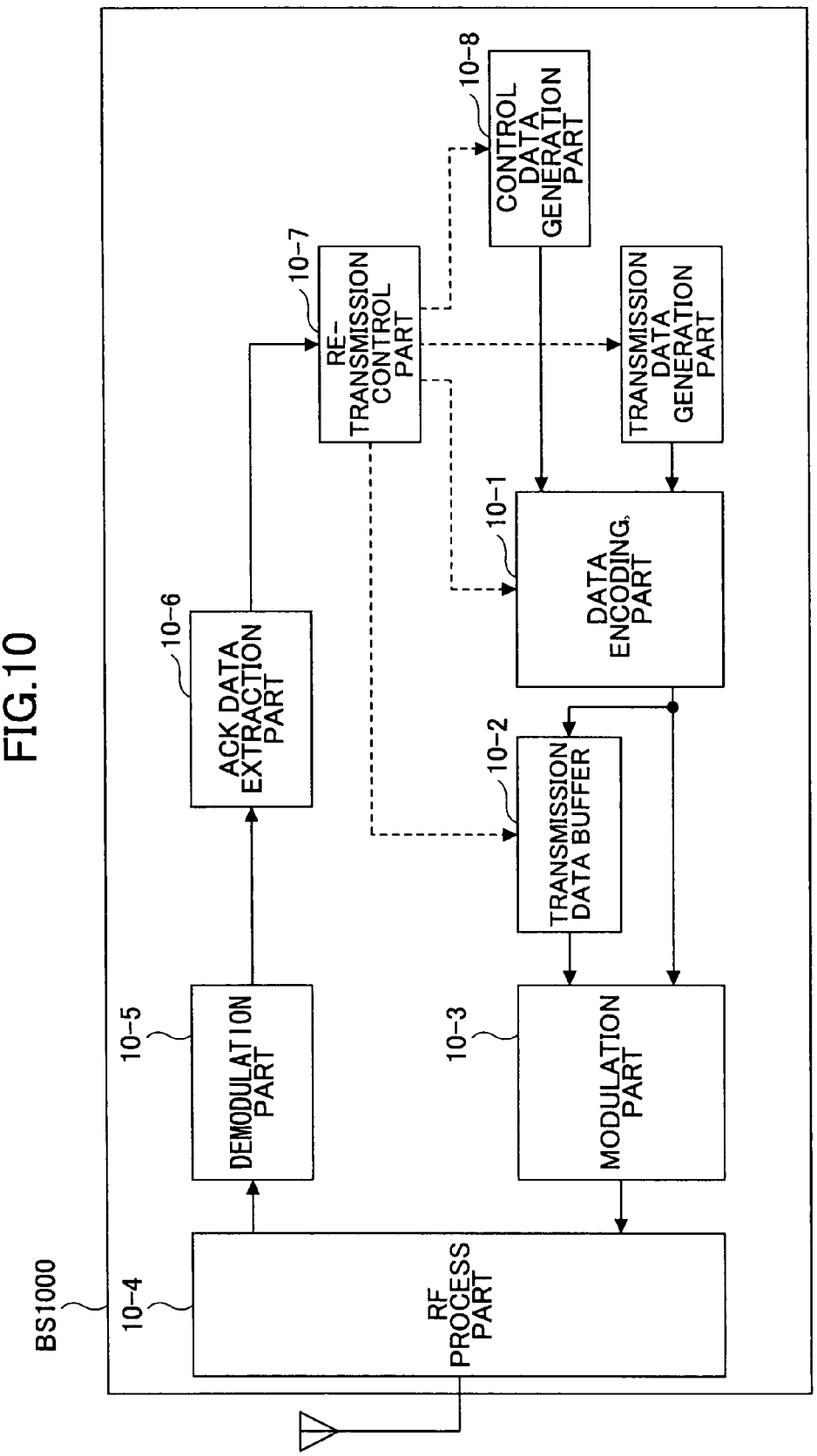
FIG. 10 is a schematic diagram showing an exemplary configuration of a wireless base station (BS) according to an embodiment of the present invention.

FIG. 10 is a schematic diagram showing an exemplary configuration of a wireless base station (BS) (transmitting station) 1000 according to an embodiment of the present invention. For the purpose of simplification, the control part for performing controls other than re-transmission and control signals thereof transmitted to other various parts are not shown in FIG. 10. In the wireless base station (BS) 1000, a data encoding part 10-1 encodes transmission data and control data. Then, a modulation part 10-3 performs modulation on the encoded data. Then, an RF processing part 10-4 converts the modulated data into RF signals. Then, the RF signals are transmitted to the downstream relay link.

Under the premise that a hybrid automatic repeat request (HARQ) process is conducted by the mobile station (MS) (receiving station), the wireless base station (BS) according to an embodiment of the present invention is provided with a transmission data buffer 10-2 for storing the data (coded data) obtained by the encoding process. Furthermore, the RF processing part 10-4 is also for down-converting signals received from the upstream relay link into base band signals. Then, a demodulation part 10-5 performs demodulation on the down-converted signals. Then, an ACK data extraction part 10-6 extracts response signals corresponding to transmitted data (data blocks) from the modulated data (signals).

The operation of the wireless base station (BS) 1000 differs depending on the type of response signal received. That is, in a case where the wireless base station (BS) receives a normal reception response (affirmative response signal ACK), the wireless base station (BS) nullifies a corresponding data block (i.e. data block corresponding to the affirmative response signal) stored in the transmission data buffer 10-2. In a case where the wireless base station (BS) 1000 receives a re-transmission request (negative response signal NACK), the retransmission control part 10-7 conducts scheduling for the retransmission. Then, in accordance with the scheduling of the retransmission control part 10-7, control data (re-transmission control data) generated in the control data generation part 10-8 and a corresponding data block stored in the transmission data buffer (10-2) are re-transmitted.

Figure 11:
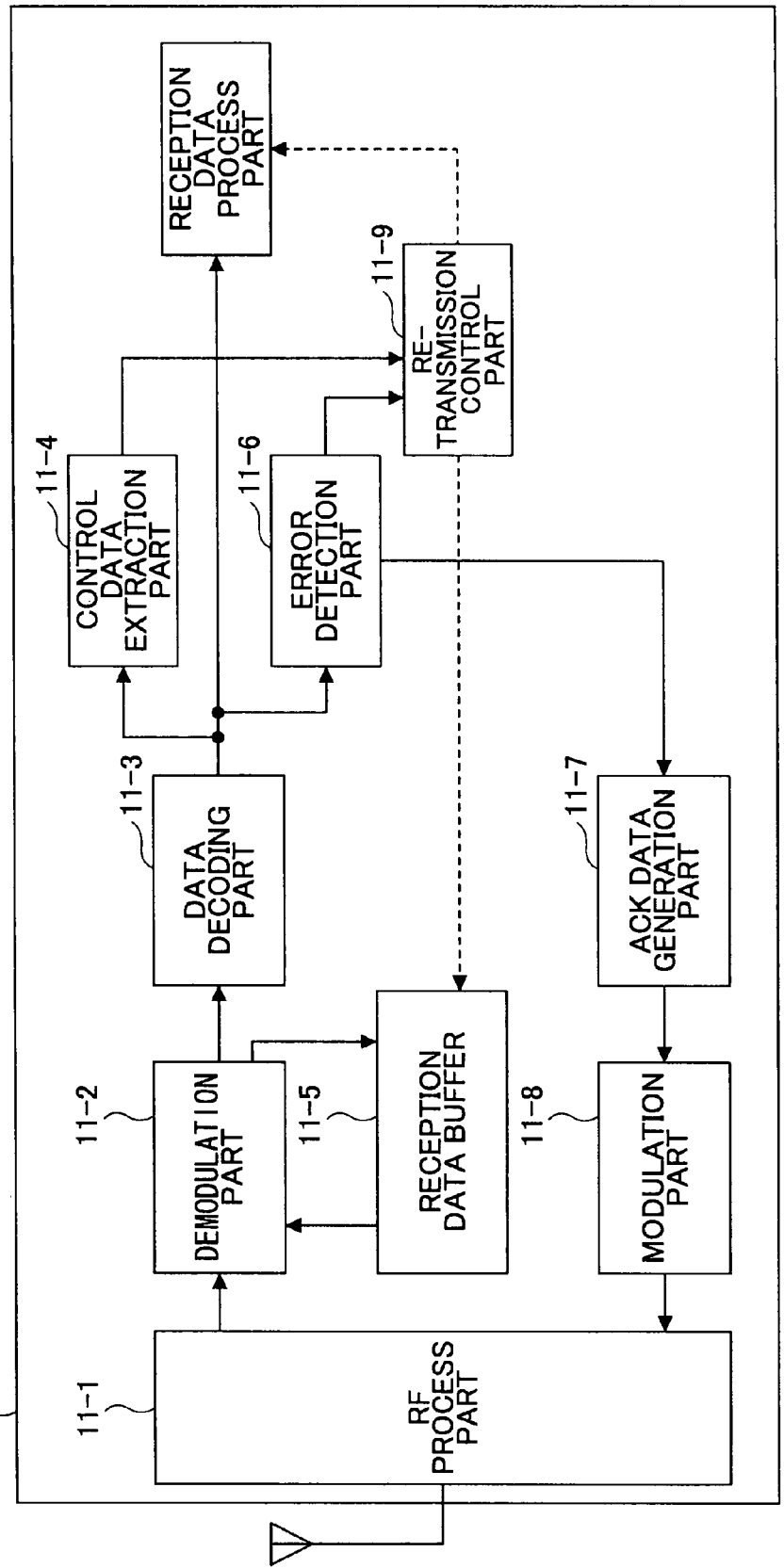
FIG. 11 is a schematic diagram showing an exemplary configuration of a mobile station (MS) according to an embodiment of the present invention.

FIG. 11 is a schematic diagram showing an exemplary configuration of a mobile station (MS) (receiving station) 1100 according to an embodiment of the present invention. In the mobile station (MS) 1100, a RF process part 11-1 down-converts a signal received from the downstream access link into a base band signal. Then, a demodulation part 11-2 performs a demodulation process on the down-converted signal. Then, a data decoding part 11-3 performs an error correction decoding process on the demodulated signal. Then, a control data extraction part 11-4 extracts control data from the decoded data. Likewise, a demodulation process and an error correction decoding process are performed on received data blocks at corresponding parts in the mobile station (MS) in accordance with the extracted control data.

The mobile station (MS) 1100 according to an embodiment of the present invention includes a reception data buffer 11-5 used for performing a HARQ (Hybrid Automatic Repeat Request) using a Chase Combining Method. Accordingly, data obtained from the demodulation process are stored in the reception data buffer 11-5. The received decoded data blocks are subject to an error detection process by an error detection part 11-6. An ACK data generation part 11-7 generates a response signal indicative of normal reception (affirmative response signal ACK) or a response signal indicative of a re-transmission request (negative response signal NACK) depending on the error detection results of the error detection part 11-6. Then, a modulation part 11-8 performs a modulation process on the generated response signal. Then, the modulated response signal is transmitted to the upstream access link via the RF process part 11-1.

In a case where no error is detected in a received data block, the reception data buffer 11-5 nullifies the corresponding data block stored therein. In a case where the mobile station (MS)

1100 receives a data block re-transmitted from the downstream access link, the demodulation part 11-2 performs maximum ratio combining between the corresponding data block stored in the reception data buffer 11-5 and the re-transmitted data block, thereby raising the gain in the demodulation process. Then, the data decoding part 11-3 performs an error correction decoding process on the combined demodulated signal. Then, the error detection part 11-6 performs error detection on the decoded data. In a case where an error is detected again, a re-transmission control part 11-9 performs a re-transmission request process with respect to the error-detected data block.

Figure 12:
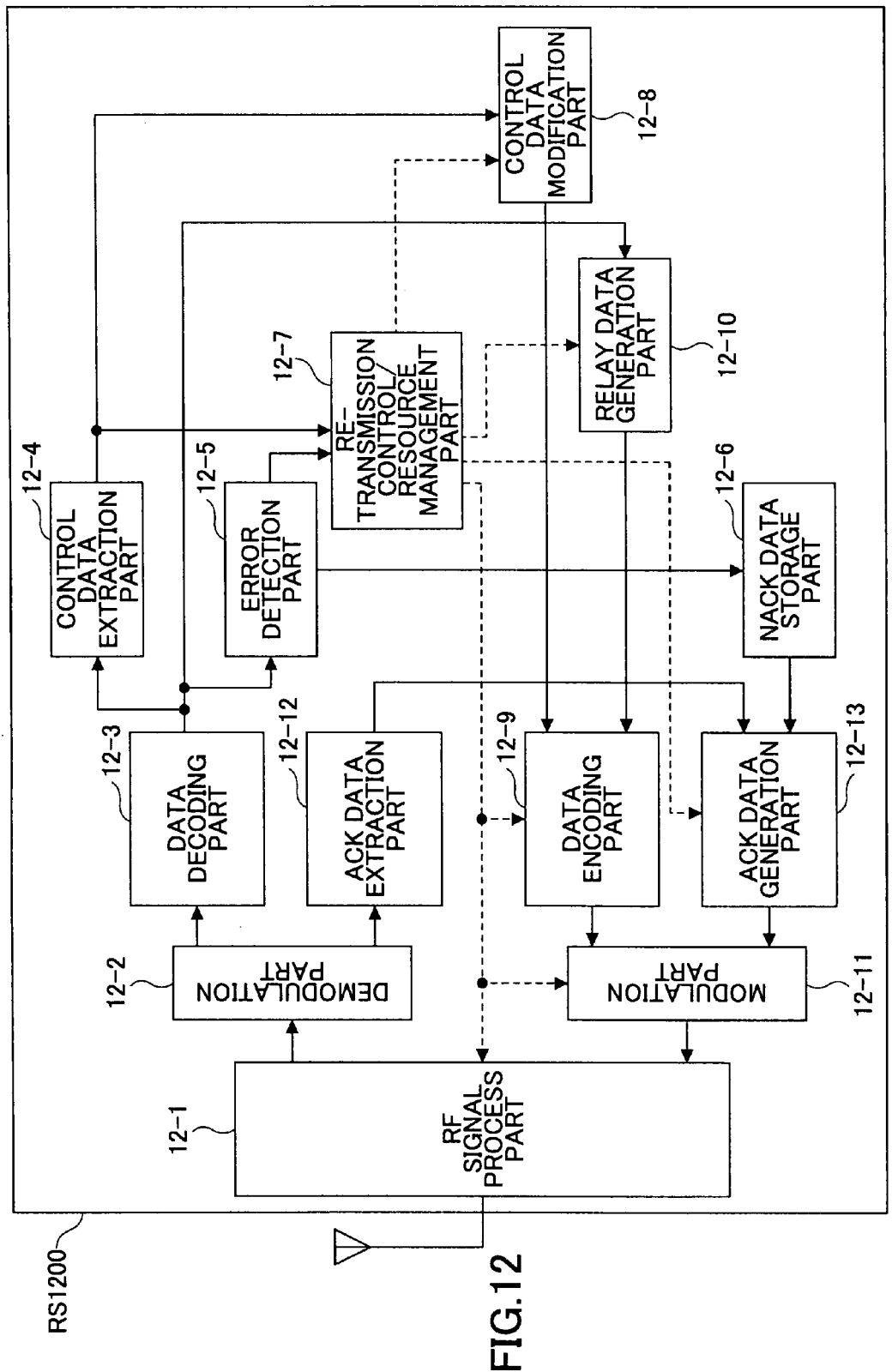
FIG. 12 is a schematic diagram showing an exemplary configuration of a relay station (RS) according to an embodiment of the present invention.

FIG. 12 is a schematic diagram showing an exemplary configuration of a relay station (RS) (relay station apparatus) 1200 according to an embodiment of the present invention. In the relay station (RS) 1200 shown in FIG. 12, an RF process part 12-1 down-converts a signal received from the downstream relay link into a base band signal. Then, a demodulation part 12-2 performs a demodulation process on the down-converted signal. Then, a data decoding part 12-3 performs an error correction decoding process on the demodulated signal. Then, a control data extraction part 12-4 extracts control data from the decoded data. Then, a demodulation process and an error correction decoding process are performed on received data blocks at corresponding parts in the relay station (RS) 1200 in accordance with the extracted control data.

In a case where an error is detected by an error detection part 12-5, a NACK data storage part 12-6 stores a negative response signal (NACK) corresponding to the error-detected data block. In addition, a re-transmission control/resource management part 12-7 prevents the error-detected data block from being transmitted to the downstream access link. Thus, a relay data generation part 12-10 is allowed to only generate transfer data corresponding to errorless data blocks.

Then, a control data modification part 12-8 modifies (updates) corresponding control data in correspondence with error detection results. Then, a data encoding part 12-9 encodes the modified control data and the transfer data generated in the relay data generation part 12-10. Then, a modulation part 12-11 performs a modulation process on the encoded data. Then, the modulated signal is transferred to the downstream access link via the RF process part 12-1. Furthermore, an ACK data extraction part 12-12 extracts a response signal received from the upstream access link. Then, an ACK data generation part 12-13 generates a response signal obtained by combining the response signal extracted by the ACK data extraction part 12-12 and the negative response signal (NACK) stored in the NACK data storage part 12-6. The combined response signal is transmitted to the upstream relay link via the modulation part 12-11 and the RF process part 12-1.

Since the re-transmission control/resource management part 12-7 prevents unnecessary data blocks from being transmitted, the mobile station (MS) can be relieved from performing unnecessary error detection or transmission of re-transmission requests. Furthermore, available (unused) upstream wireless transmission resources, which are originally assigned for transmitting response signals requesting re-transmission, can be increased. Furthermore, since wireless transmission resources of the downstream access link corresponding to deleted data blocks can be effectively used, the re-transmission control/resource management part 12-7 can re-assigned the available (unused) wireless transmission resources to received errorless data blocks.

The data blocks having more wireless transmission resources assigned thereto can be transmitted in the downstream access link with an increased redundancy corresponding to the increased amount of resources assigned thereto. The changing of the assigned resources may be realized by changing the rate of the error correction encoding (e.g., changing the code rate or bit number of puncture) in the data encoding part 12-9. The control data modification part 12-8 applies (adds) the data indicating such change of the error correction coding to the control data to be transferred to the downstream access link.

Furthermore, as for another example of changing the assigning of wireless transmission resources, the modulation process conducted by the modulation part 12-11 may be changed. This includes, for example, changing modulation method (16 QAM (Quadrature Amplitude Modulation) to QPSK (Quadri-Phase Shift Keying)), changing the number of times of bit repetition, or changing the mapping method (increasing inserting number of pilot signals and increasing precision of channel estimation of the mobile station (MS)). The control data modificationi part 12-8 applies (adds) the data indicating such change of the modulation process of the modulation part 12-11 to the control data to be transferred to the downstream access link.

Furthermore, as for another example of changing the assigning of wireless transmission resources, the transmission power of data blocks may be changed. In a case where a maximum value of the total amount of power that can be transmitted in the downstream access link at a predetermined time is set beforehand, transmission power, which is originally assigned to a data block transmitted in the downstream relay link, becomes available (unused) when the data block is deleted due to an error found in the data block. Thereby, the available transmission power can be used for transmitting the other remaining errorless data blocks.

The changing of transmission power may be realized by changing the amplitude of data symbol mapping in the modulation part (digital modulation part) 12-11 or by adjusting the gain of the RF process part 12-1. In a case where data regarding transmission power are not included in the control data, control data are changed by simply deleting data corresponding to the error-detected data block.

Furthermore, as for another example of changing the assigning of wireless transmission resources, a wireless transmission resource in the upstream access link, which is originally assigned for transmitting a response signal corresponding to a given data block, becomes available (unused) when the data block is prevented from being transferred due to an error found in the data block in the downstream relay link. Thereby, the available wireless transmission resource can be re-assigned for transmitting other remaining errorless data blocks. In order to conduct this re-assigning process, corresponding control data are changed in the control data modification part 12-8 and are transmitted to the downstream access link.

Figure 13:
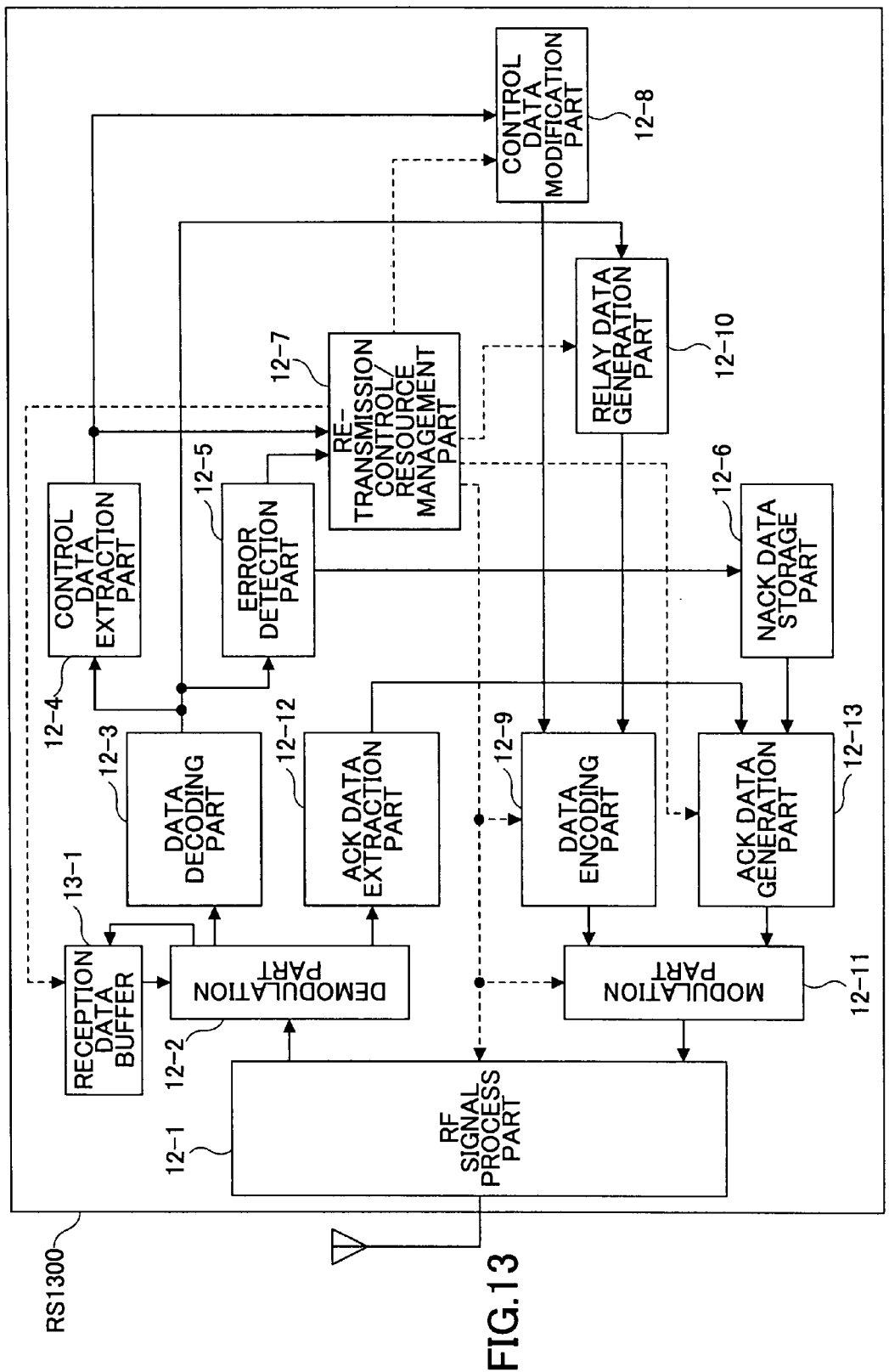
FIG. 13 is a schematic diagram showing an exemplary configuration of a relay station (RS) according to an embodiment of the present invention in which a relay station (RS) performs HARQ (Hybrid Automatic Repeat Request)
Figure 14:
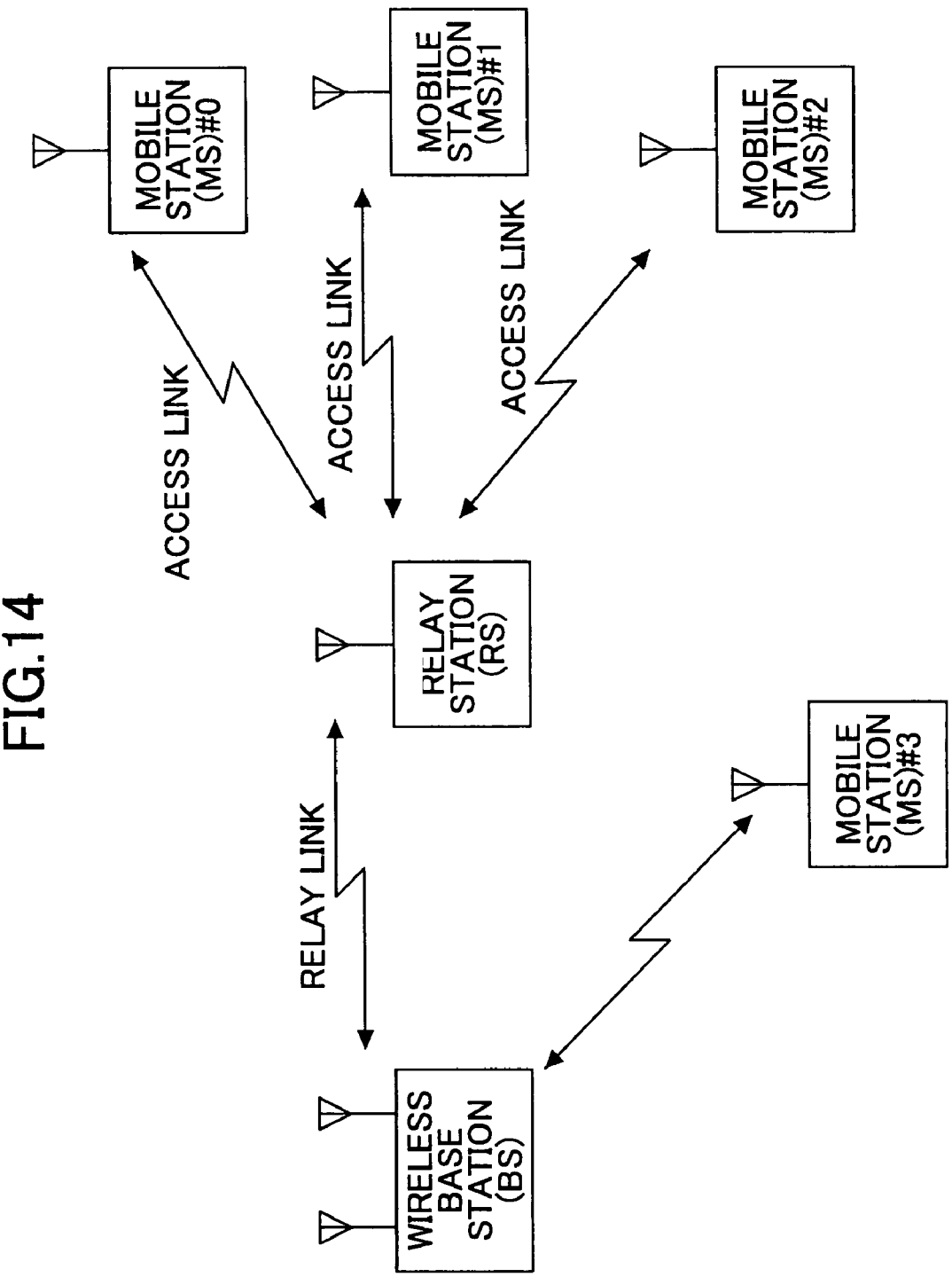
FIG. 14 shows an example of a communication system (to which the present invention may be applied)
Figure 15:
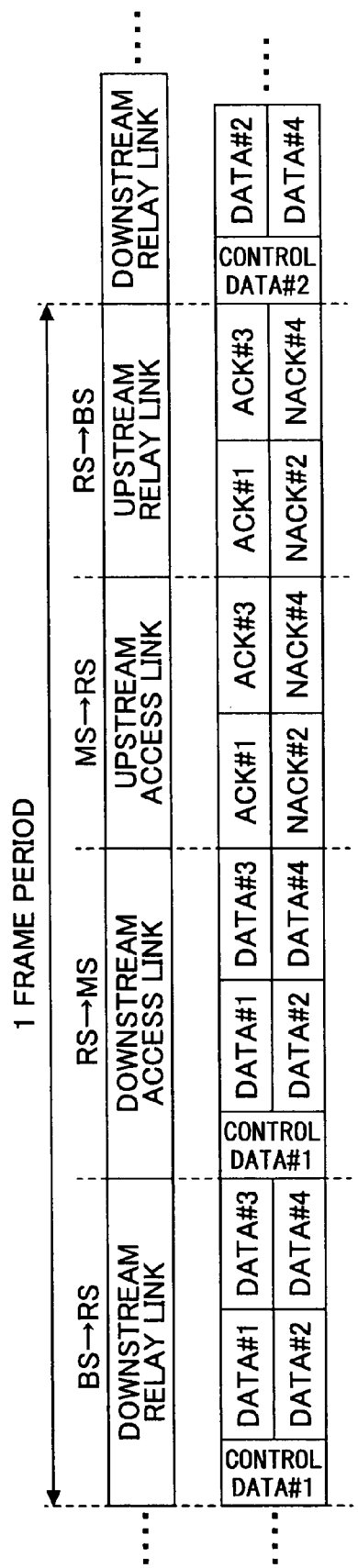
FIG. 15 is a schematic diagram showing an exemplary configuration of a wireless frame for relay communications.
Figure 16:
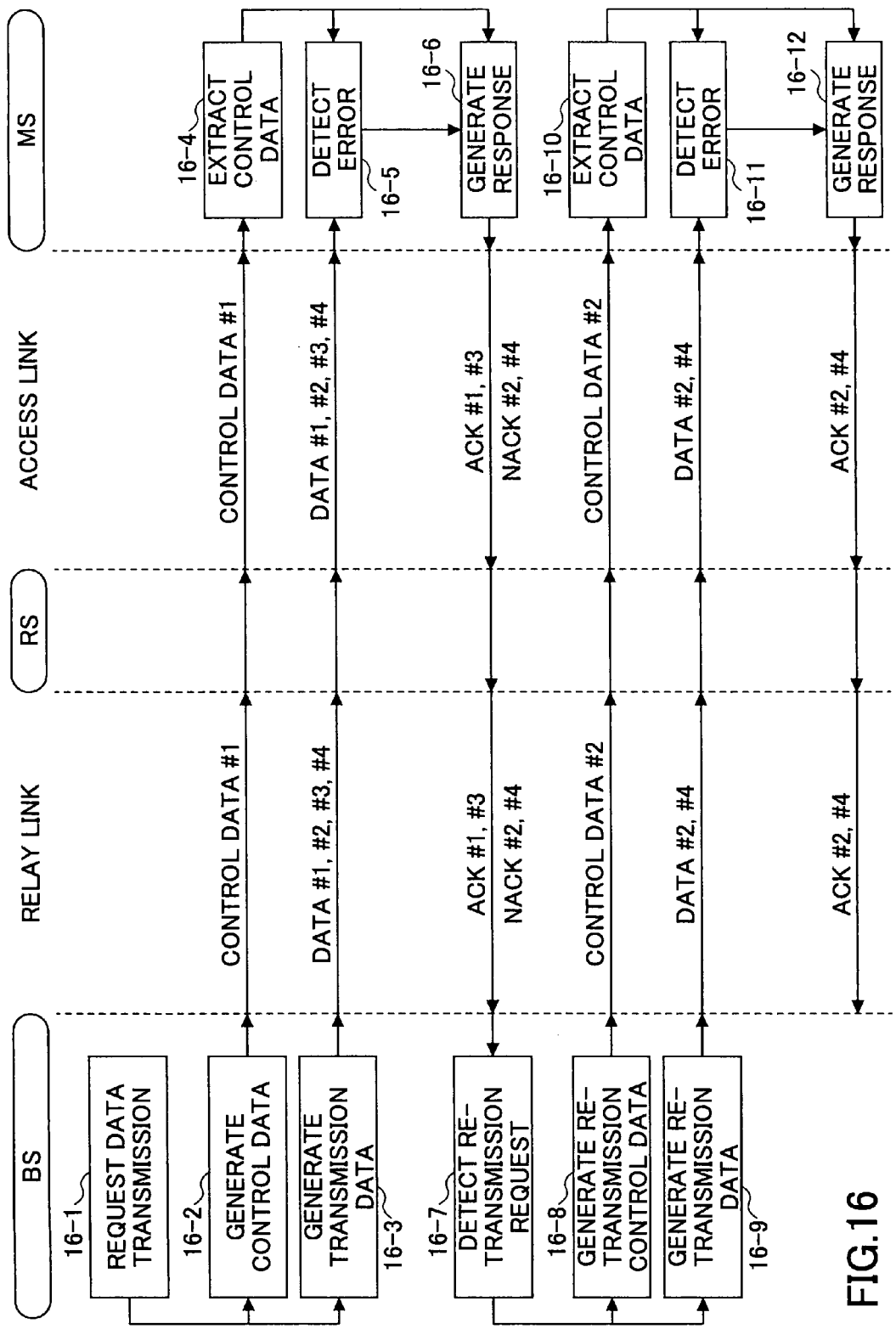
FIG. 16 is a sequence diagram showing data communication according to the frame shown in FIG. 15.
Figure 17:
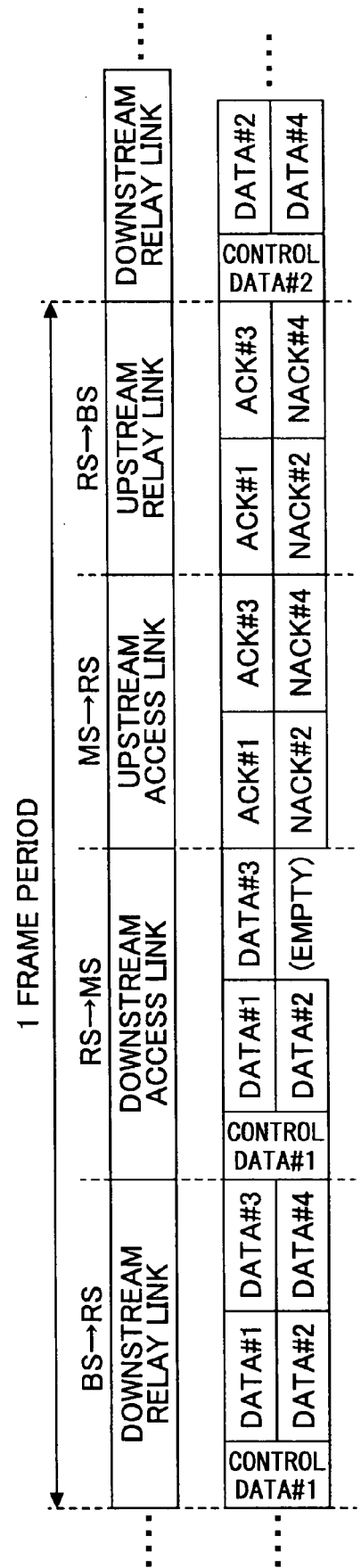
FIG. 17 is a schematic diagram showing an exemplary frame configuration in a case where error data are not transmitted to a downstream access link.
Figure 18:
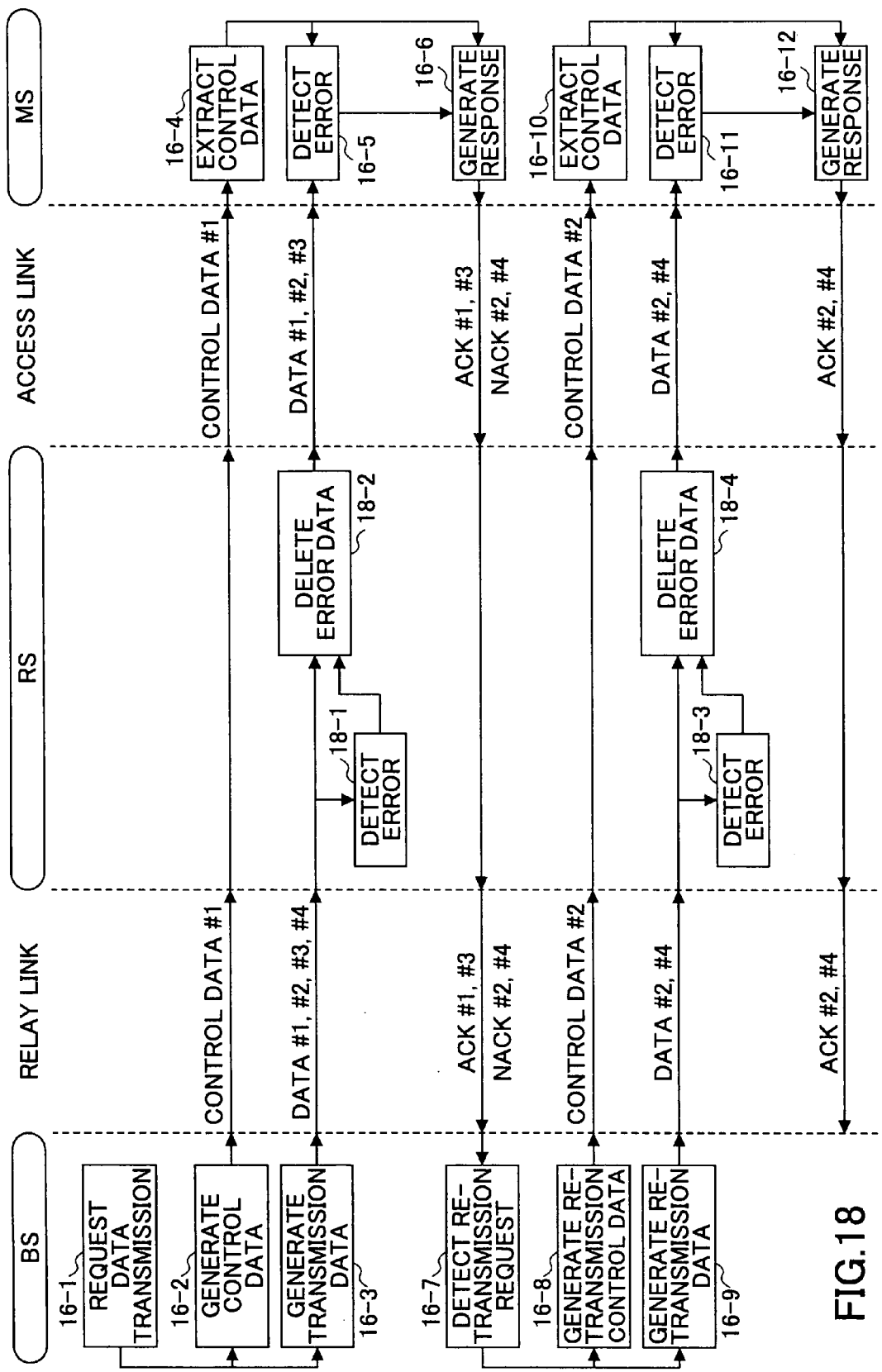
FIG. 18 is a sequence diagram showing data communication according to the frame shown in FIG. 17.
Figure 19:
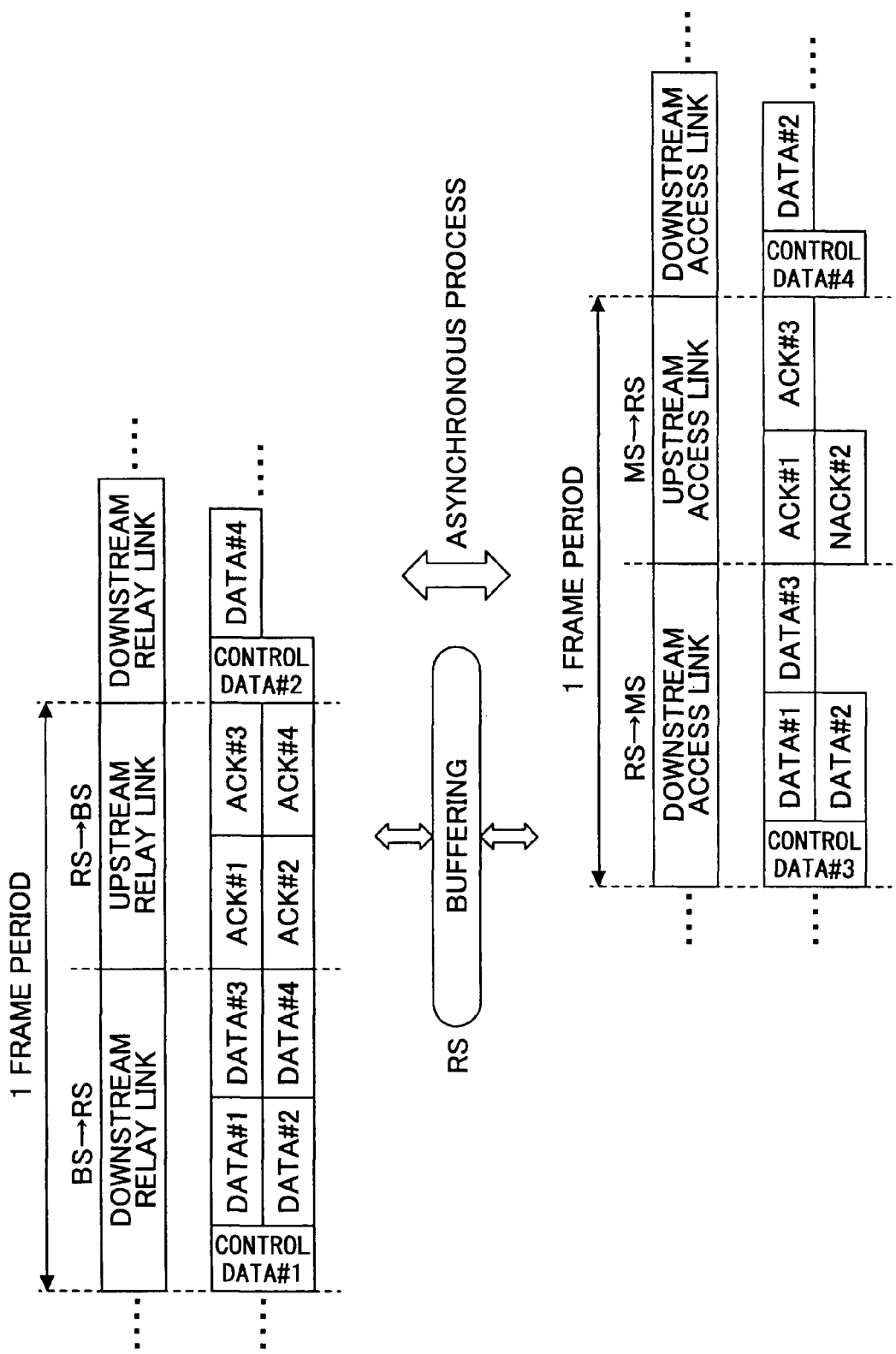
FIG. 19 is a schematic diagram showing an exemplary frame configuration in a case where buffering is performed by a relay station (RS)
Figure 20:
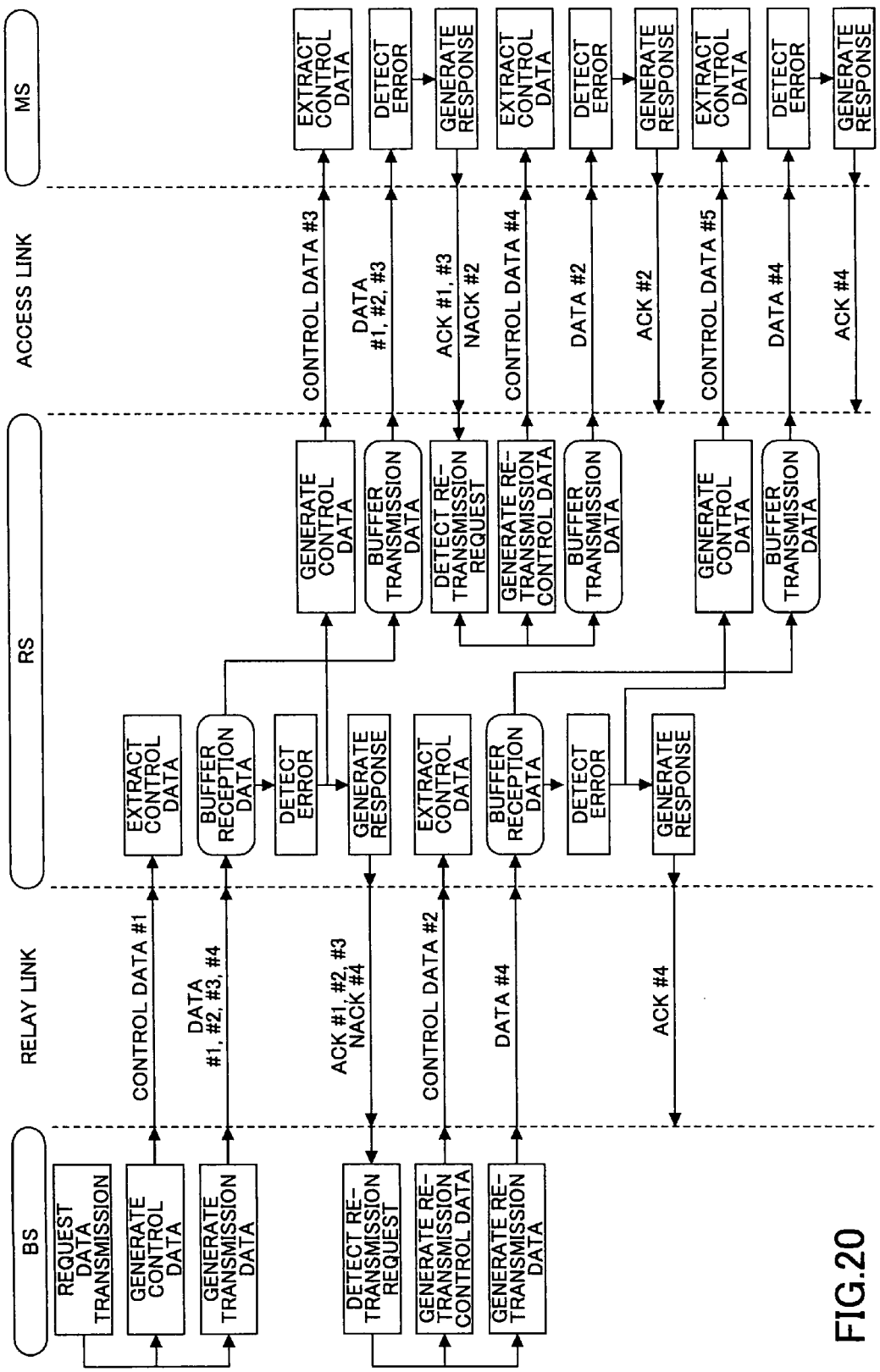
FIG. 20 is a sequence diagram showing data communication according to the frame shown in FIG. 19.

FIG. 13 is a schematic diagram showing an exemplary configuration of a relay station (RS) (relay station apparatus) 1300 according to another embodiment of the present invention in which the relay station (RS) 1300 performs HARQ (Hybrid Automatic Repeat Request) using a Chase Combining method. The relay station (RS) 1300 includes a reception data buffer 13-1 for storing data obtained by demodulating data received from the downstream relay link. In a case where no errors are found in a received data block according to error detection results from the error detection part 12-5, the stored data of the reception data buffer 13-1 corresponding to the errorless data block are nullified and the errorless data block is transmitted to the mobile station (MS).

In a case where error is detected, the relay station (RS) 1300 requests re-transmission to the wireless base station (BS) in the same manner as the configuration shown in FIG. 12. Thus, in a case where the relay station (RS) receives a data block re-transmitted from the downstream relay link, the demodulation part 12-2 performs maximum ratio combining between the corresponding data block stored in the reception data buffer 13-1 and the re-transmitted data block, thereby raising the gain in the demodulation process. Since the error correction decoding process is performed by the data decoding part 12-3 after the combining of the re-transmitted data and errorless data blocks are transferred to the downstream access link within a current frame (frame period), there is no need to prepare a transmission buffer for responding to errors in the access link. Thus, a synchronized transfer of re-transmission data can be realized between the wireless base station (BS) and the mobile station (MS).

Although the above-described frame according to an embodiment of the present invention is described having a configuration including an upstream link and a downstream link multiplexed by TDD (Time Division Duplex), the frame is not limited to such configuration. For example, the upstream link and the downstream link may be multiplexed according to a FDD (Frequency Division Duplex) method.

Furthermore, in a frame having a configuration including an upstream link and a downstream link multiplexed by TDD (Time Division Duplex), a resource (communication time) of a downstream access link corresponding to a data block having an error found in the downstream data link can be reassigned as a resource (communication time) of an upstream access link. Alternatively, a resource (communication time) of an upstream access link assigned for transmitting a response signal corresponding to an error-detected untransferred data block can be reassigned as a resource (communication time) of a downstream access link.

Although the relay communication system according to an embodiment of the present invention is described having one relay station (RS) provided between a wireless base station (BS) and a mobile station (MS), the relay communication system is not limited to such configuration. For example, the relay communication system may be configured having plural relay stations (RS) provided between the wireless base station (BS) and the mobile station (MS) in which each relay station (RS) is provided with the same function as the above-described relay station according to an embodiment of the present invention.

Further, the present invention is not limited to these embodiments, but variations and modifications may be made without departing from the scope of the present invention.

The present application is based on Japanese Priority Application No. 2006-235955 filed on Aug. 31, 2006, with the Japanese Patent Office, the entire contents of which are hereby incorporated by reference.

What is claimed is:

1. A re-transmission control method for conducting wireless communication between a transmitting station and a receiving station via a relay station, the method comprising:
   a) transmitting data including control data and a plurality of data blocks from the transmitting station to the relay station;
   b) detecting whether there is an error in the plural data blocks at the relay station;
   c) updating the control data when an error is detected in at least one of the plural data blocks at the relay station;
   d) preventing an error-detected data block at the relay station from being transferred to the receiving station;
   e) transferring the updated control data and remaining data blocks from the relay station to the receiving station;
   f) generating a first negative response signal corresponding to the error-detected data block at the relay station;
   g) storing the first negative response signal at the relay station;
   h) detecting whether there is an error in the remaining data blocks transferred from the relay station at the receiving station;
   i) returning an affirmative response signal or a second negative response signal according to the detection results from the receiving station to the transmitting station;
   j) combining the first negative response signal with the affirmative response signal or the second negative response signal at the relay station;
   k) transmitting the combined response signal from the relay station to the transmitting station; and
   l) re-transmitting the error-detected data blocks corresponding to the first and second negative response signals from the transmitting station.

2. The re-transmission control method as claimed in claim 1, further comprising:
   assigning a wireless transmission resource generated by preventing the error-detected data block at the relay station from being transferred to the receiving station, wherein the wireless transmission resource is assigned to one or more of the remaining data blocks transferred to the receiving station.

3. The re-transmission control method as claimed in claim 2, wherein the assigning includes:
   changing an error correction coding method used for transferring the remaining data blocks by increasing the number of redundant bits.

4. The re-transmission control method as claimed in claim 2, wherein the assigning includes:
   changing a modulation method used for transferring the remaining data blocks by increasing an inter-symbol distance.

5. The re-transmission control method as claimed in claim 2, wherein the assigning includes:
   changing transmission power used for transferring the remaining data blocks by increasing transmission power.

6. The re-transmission control method as claimed in claim 1, further comprising:
   assigning a wireless transmission resource generated by preventing the error-detected data block at the relay station from being transferred to the receiving station, wherein the wireless transmission resource is assigned to other wireless transmission resources used for transmitting data from the receiving station to the transmitting station.

7. A relay station apparatus for relaying wireless communication between a transmitting station and a receiving station, the relay station apparatus comprising:
   a receiving part that receives data including control data and a plurality of data blocks from the transmitting station;
   a detecting part that detects whether there is an error in the plural data blocks;
   an updating part that updates the control data when an error is detected in at least one of the plural data blocks;
   a preventing part that prevents an error-detected data block from being transferred to the receiving station;
   a transferring part that transfers the updated control data and remaining data blocks to the receiving station;
   a generating part that generates a first negative response signal corresponding to the error-detected data block;

a storing part that stores the first negative response signal;

a combining part that combines the first negative response signal with an affirmative response signal or a second negative response signal received from the receiving station according to error detection results by the receiving station; and a transmitting part that transmits the combined response signal to the transmitting station.

8. The relay station apparatus as claimed in claim 7, further comprising a re-transmission control/resource management part that assigns a wireless transmission resource generated by preventing the error-detected data block at the relay station apparatus from being transferred to the receiving station, wherein the wireless transmission resource is assigned to one or more of the remaining data blocks transferred to the receiving station.

9. The relay station apparatus as claimed in claim 8, wherein the re-transmission control/resource management part includes an error correction coding method changing part that changes an error correction coding method used for transferring the remaining data blocks by increasing the number of redundant bits.

10. The relay station apparatus as claimed in claim 8, wherein the re-transmission control/resource management part includes a modulation method changing part that changes a modulation method used for transferring the remaining data blocks by increasing an inter-symbol distance.

11. The relay station apparatus as claimed in claim 8, wherein the re-transmission control/resource management part includes a transmission power changing part that changes transmission power used for transferring the remaining data blocks by increasing transmission power.

12. The relay station apparatus as claimed in claim 7, further comprising a re-transmission control/resource management part that assigns a wireless transmission resource generated by preventing the error-detected data block at the relay station apparatus from being transferred to the receiving station, wherein the wireless transmission resource is assigned to other wireless transmission resources used for transmitting data from the receiving station to the transmitting station.

* * * * *